(12) United States Patent
Kwak

(10) Patent No.: US 11,518,690 B2
(45) Date of Patent: Dec. 6, 2022

(54) SUBMERGED PLASMA GENERATOR AND APPLICATION COMPRISING SAME

(71) Applicant: K FUSION TECHNOLOGY INC., Ansan-si (KR)

(72) Inventor: Hon Kil Kwak, Seoul (KR)

(73) Assignee: K FUSION TECHNOLOGY INC., Ansan-si (KR)

( * ) Notice: Subject to any disclaimer, the term of this patent is extended or adjusted under 35 U.S.C. 154(b) by 0 days.

(21) Appl. No.: 17/058,132

(22) PCT Filed: Feb. 22, 2019

(86) PCT No.: PCT/KR2019/002200
§ 371 (c)(1),
(2) Date: Nov. 23, 2020

(87) PCT Pub. No.: WO2020/171261
PCT Pub. Date: Aug. 27, 2020

(65) Prior Publication Data
US 2021/0371306 A1    Dec. 2, 2021

(51) Int. Cl.
*C02F 1/46*          (2006.01)
*H05H 1/24*          (2006.01)
(Continued)

(52) U.S. Cl.
CPC .............. *C02F 1/4608* (2013.01); *C01B 3/06* (2013.01); *C01B 3/503* (2013.01); *C02F 1/30* (2013.01);
(Continued)

(58) Field of Classification Search
CPC ... C02F 1/30; C02F 1/34; C02F 1/4608; B01J 19/008; H05H 1/24; H05H 1/247
See application file for complete search history.

(56) References Cited

U.S. PATENT DOCUMENTS

2008/0099406 A1    5/2008   Ruan et al.
2009/0039731 A1    2/2009   Yang
2013/0206704 A1    8/2013   Hengsperger et al.

FOREIGN PATENT DOCUMENTS

CN          101692369 A      4/2010
JP         2000-202458 A      7/2000
(Continued)

OTHER PUBLICATIONS

Machine Translation of KR 10-1778438 (Year: 2017).*

*Primary Examiner* — Lessanework Seifu
(74) *Attorney, Agent, or Firm* — Invenstone Patent, LLC

(57) ABSTRACT

A submerged plasma generator includes: a reactor inside of which a flow path, through which a working fluid passes, is formed along a lengthwise direction; and a dielectric insert which is disposed in the flow path so as to define the flow path into one space and the other space, and has formed therein a through-hole to generate micro-nano bubbles by cavitation in the working fluid fed into the one space of the flow path, and includes, a metallic catalyst which undergoes friction with the working fluid flowing through the through-hole and releases electric charges of the same polarity to the micro-nano bubbles to collapse the micro-nano bubbles and generate plasma; in which the other space of the flow path in which the working fluid ionized by exposure to the plasma travels is formed in an oval structure.

11 Claims, 20 Drawing Sheets

(51) Int. Cl.
  *C01B 3/06* (2006.01)
  *C01B 3/50* (2006.01)
  *C02F 1/30* (2006.01)
  *C02F 1/34* (2006.01)
  *C02F 1/48* (2006.01)

(52) U.S. Cl.
  CPC ............... *C02F 1/34* (2013.01); *C02F 1/482* (2013.01); *H05H 1/247* (2021.05)

(56) References Cited

FOREIGN PATENT DOCUMENTS

| | | |
|---|---|---|
| JP | 2009-119347 A | 6/2009 |
| JP | 2013-211204 A | 10/2013 |
| KR | 10-2000-0036794 A | 7/2000 |
| KR | 10-2000-0067720 A | 11/2000 |
| KR | 10-2005-0089000 A | 9/2005 |
| KR | 10-0828047 B1 | 5/2008 |
| KR | 10-2009-0052669 A | 5/2009 |
| KR | 10-2010-0011246 A | 2/2010 |
| KR | 10-2016-0134252 A | 11/2016 |
| KR | 10-1778438 B1 | 9/2017 |
| WO | WO2004/041715 * | 5/2004 |

* cited by examiner (a)

(b)

(a)

(b)

(a)

(b)

(a)

(b)

SUBMERGED PLASMA GENERATOR AND APPLICATION COMPRISING SAME

CROSS-REFERENCE TO RELATED APPLICATIONS

This application is a national stage of International Application No. PCT/KR2019/002200, filed on Feb. 22, 2019.

TECHNICAL FIELD

The present invention relates to a submerged plasma generator and an application including the same, and more particularly to a submerged plasma generator which continuously generates plasma using fluid (liquid) moving in one direction and ionizes the fluid using the plasma to produce a plasma activated water or separates hydrogen ions from the ionized fluid to produce a hydrogen gas and an application including the same.

BACKGROUND

Plasma refers to a gaseous state which is separated into electrons (e−) with negative charges and ions (A+: hydrogen atom nuclei) with positive charges at an ultra-high temperature. Further, the plasma also refers to a gas in which particles with electricity are gathered. The plasma has a very high charge separation degree, but is electrically neutral because the number of negative charges and the number of positive charges are totally the same. When a high energy is applied to a gas in a molecular state, the gas is separated into electrons and atomic nuclei at tens of thousands of ° C. to become a plasma state.

In other words, when an energy is applied to a solid, the solid becomes liquid and gas and then when a high energy is applied to the gaseous state again, the gas becomes an ionized state in which the outermost electron (e−) orbiting around the atomic nucleus deviates from the orbit (ionization energy) at tens of thousands of ° C. At this time, the gas becomes a substance in the other dimension in which a gas property of the molecular state is lost. The plasma is also referred to as a fourth substance state. In the ionized state, an atom A has a following structural formula.

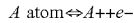

$A \text{ atom} \Leftrightarrow A{++}e{-}$

The plasma is electrically neutral in a state in which the outermost electron orbiting around the atomic nucleus is dissociated so that positive ions and negative ions coexist. The plasmas are good electrical conductors.

Further, in the ionized state of the substance, energy is released by returning to its original stable state over the time. Typical plasma observed in the natural phenomenon is lightning and the aurora in the Arctic region and ion layers in the atmosphere are in the plasma state.

The plasma is a state in which the atomic nucleus and electrons are separated and is generated by applying a lot of heat to gaseous atom so that all atoms in the hot sun which is 15 million° C. or higher are in the plasma state.

The plasma may be the most common state in the universe. However, in order to use the plasma in everyday life, the plasma needs to be artificially produced. Efforts to artificially generate and commercialize plasma have been steadily promoted for a long time.

The plasma may be generated by applying heat or by applying a high electric field or a magnetic field to induce collision of electrons. Commonly, the plasma is generated using electrical methods such as direct current, an ultra-high frequency, and an electron beam and then needs to be maintained using the magnetic field and the like.

However, a technique of generating plasma with a high density through gas, which has been used in the related art is hard to be progressed to use the plasma as an energy because a material which has an input energy higher than an output energy or withstands an ultra-high temperature state which can confine the plasma has not been developed.

Further, the plasma is an energy source which is directly used for industrial purpose, but according to the plasma generating method of the related art, a contradiction that the plasma is generated using a lot of electricity and the electricity acquired thereby is used as an energy source is repeated so that there is a serious problem in that the efficiency of the energy usage is degraded.

SUMMARY

The present invention is contrived to solve the above-described problem and an object of the present invention is to provide a submerged plasma generator which generates a large amount of micro-nano bubbles with a size of 5 µm or less formed in a fluid moving in one direction through a cavitation phenomenon and having a negatively charged surface potential, applies the electric charges of the same polarity to the micro-nano bubbles moving together with the fluid through a metallic catalyst to continuously collapse the micro-nano bubbles by a repulsive force to generate a plasma with a high density, and an application including the same.

Another object of the present invention is to provide a submerged plasma generator which shields a plurality of magnetic substances installed on an outer surface of the reactor and forms a plurality of magnetic substances opposite to each other with a flow path therebetween in a wedge structure to form a stable magnetic field in the flow path and maximize a magnetic flux density, and an application including the same.

Still another object of the present invention is to provide a submerged plasma generator which forms a flow path through which an ionized working fluid flows, in an oval structure to maximize an ion separation efficiency and produces a plasma activated water using the submerged plasma or produces and supplies hydrogen gas by itself, and an application including the same.

Technical problems of the present invention are not limited to the above-mentioned technical problems, and other technical problems, which are not mentioned above, can be clearly understood by those skilled in the art from the following descriptions.

In order to solve the above-described problems, a submerged plasma generator according to an embodiment of the present invention includes a reactor inside of which a flow path, through which a working fluid passes, is formed along a lengthwise direction; and a dielectric insert which is disposed in the flow path so as to define the flow path into one space and the other space, and has formed therein a through-hole smaller than the flow path to generate micro-nano bubbles by cavitation in the working fluid fed into the one space of the flow path, and includes, on one side thereof, a metallic catalyst which undergoes friction with the working fluid flowing through the through-hole and releases electric charges of the same polarity to the micro-nano bubbles to collapse the micro-nano bubbles and generate plasma; in which the other space of the flow path in which the working fluid ionized by exposure to the plasma travels is formed in an oval structure.

One space of the flow path may be formed in a circular structure in which a horizontal diameter and a vertical diameter are the same and the other space of the flow path may be formed such that a horizontal diameter is larger than a vertical diameter.

The other space of the flow path may be formed in a track type oval structure including a plurality of flat sections disposed to be opposite to each other in a vertical direction and a plurality of curved sections disposed to be opposite to each other in a horizontal direction.

The working fluid may be applied by hard water, a mixed fluid in which hard water and heavy water are mixed, a mixed fluid in which hard water and methanol are mixed, or a mixed fluid in which hard water and ethanol are mixed.

The submerged plasma generator may further include an ion separation unit which is provided on an outer surface of the reactor corresponding to the other space of the flow path, forms a magnetic field in the other space of the flow path to separate $H^+$ ions and $OH^-$ ions from the working fluid which is ionized by exposure to the plasma by passing through the dielectric insert, and a contact surface of the ion separation unit which is in contact with an outer surface of the reactor may correspond to a diameter of the other space of the flow path or may be formed to have a width larger than the diameter of the other space of the flow path.

A seating support groove in which the ion separation unit is seated may be formed on an outer surface of the reactor to be dented with a predetermined depth toward the flow path and the contact surface which is in contact with the seating support groove and an inner surface of the reactor which forms the other space of the flow path may be spaced apart from each other with a distance of at least 4 to 11 mm therebetween.

The ion separation unit may include a plurality of magnetic substances which is disposed to opposite to each other with the flow path therebetween along a vertical direction and is formed to enclose the entire outer surface or a part of the outer surface of the reactor and the plurality of magnetic substances includes a first magnetic substance which is disposed at an upper side of the reactor such that an S polarity is directed to the flow path and a second magnetic substance which is disposed at a lower side of the reactor such that an N polarity is directed to the flow path.

The plurality of magnetic substances may be formed in a wedge structure in which a width of a cross section is gradually reduced toward the flow path.

The ion separation unit may further include a magnetic substance support unit which supports both side surfaces of the plurality of magnetic substances to restrict the flow of the plurality of magnetic substances.

The ion separation unit may further include a shielding unit which is provided at the outside of the first magnetic substance and the second magnetic substance so as to enclose the first magnetic substance and the second magnetic substance to shield a magnetic field formed by the first magnetic substance and the second magnetic substance.

The shielding unit may be formed of a metallic material and may be formed in a multilayered structure The ion separation unit may further include a third magnetic substance which is disposed on both side surfaces of the first magnetic substance such that an S polarity is directed to the first magnetic substance and a fourth magnetic substance which is disposed on both side surfaces of the second magnetic substance to be opposite to the third magnetic substance such that an N polarity is directed to the second magnetic substance.

The submerged plasma generator may further include a branch unit which is provided in the reactor and includes a plurality of branched flow paths configured to branch the $H^+$ ion and the $OH^-$ ion separated by the ion separation unit to different directions.

The plurality of branched flow paths may include a first branched flow path which guides the movement of the working fluid including $H^+$ ions and a second branched flow path which is disposed to be opposite to the first branched flow path along a horizontal direction and guides the movement of the working fluid including $OH^-$ ions and the first branched flow path and the second branched flow path may be branched at an angle of 26.5 degrees to 30 degrees.

A hydrogen station according to an embodiment of the present invention includes the above-described submerged plasma generator.

Further, a plasma activated water producing system according to an embodiment of the present invention includes the above-described submerged plasma generator.

DETAILED DESCRIPTION

Figure 1:
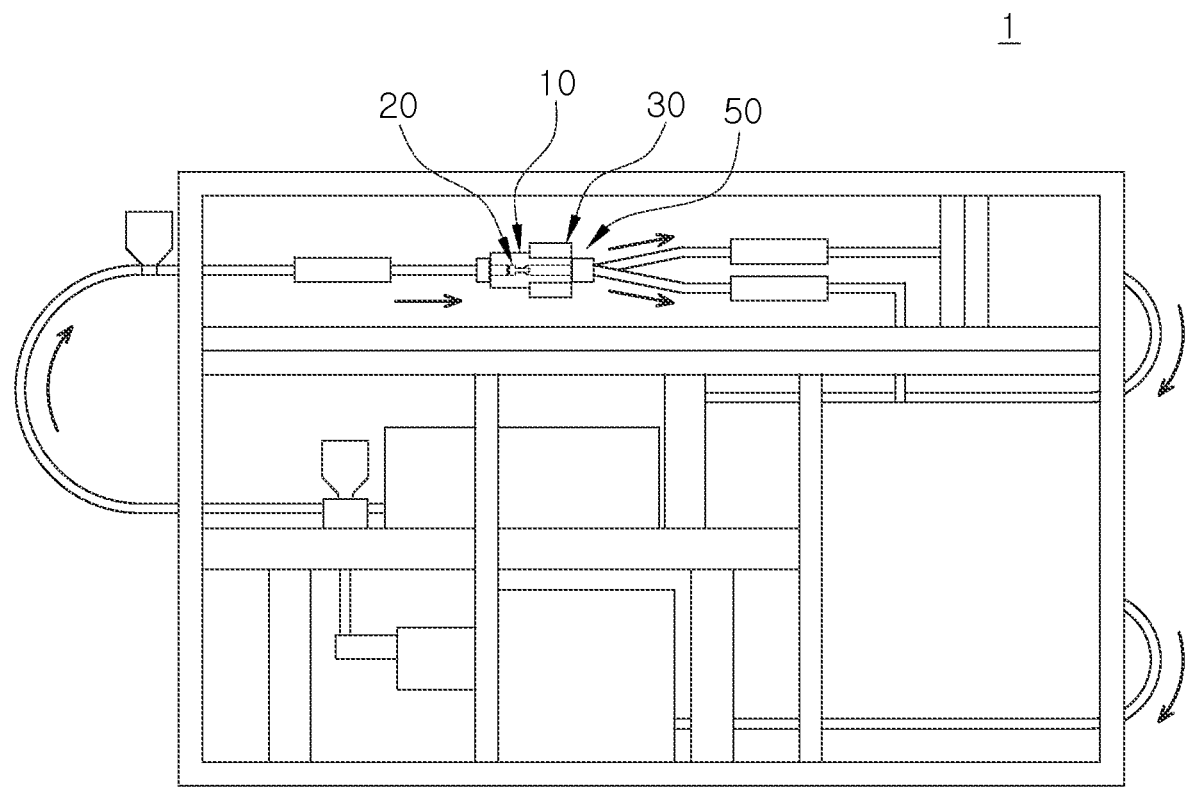
FIG. 1 is a diagram schematically illustrating a submerged plasma generator according to an embodiment of the present invention.

Hereinafter, various embodiments will be described in more detail with reference to accompanying drawings. The embodiment disclosed in the present specification may be modified in various forms. A specific embodiment is illustrated in the drawings and is described in detail in the detailed description. However, the specific embodiment disclosed in the accompanying drawing is merely provided for easy understanding of various embodiments. Accordingly, it should be understood that the technical spirit is not limited by the specific embodiment disclosed in the accompanying drawing, but includes all equivalents or alternatives included in the spirit of and the technical scope of the present invention.

Terms including an ordinary number, such as first and second, are used for describing various constituent elements, but the constituent elements are not limited by the terms. The above terms are used only to discriminate one component from the other component.

In the present specification, it should be understood that terminology "include" or "have" indicates that a feature, a number, a step, an operation, a component, a part or the combination thoseof described in the specification is present, but does not exclude a possibility of presence or addition of one or more other features, numbers, steps, operations, components, parts or combinations, in advance. It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

In the meantime, the term "module" or" "unit" for components used in the present specification performs at least one function or operation. Further, "module" or "unit" may perform a function or an operation by hardware, software or a combination of hardware and software. Further, a plurality of "modules" or a plurality of "units" excluding "module" or "unit" which has to be executed in a specific hardware or is executed in at least one processor may be integrated as at least one module. A singular form may include a plural form if there is no clearly opposite meaning in the context.

In addition, in the description of the present invention, a detailed description of known configurations or functions incorporated herein will be contracted or omitted when it is determined that the detailed description may make the subject matter of the present invention unclear.

Figure 2:
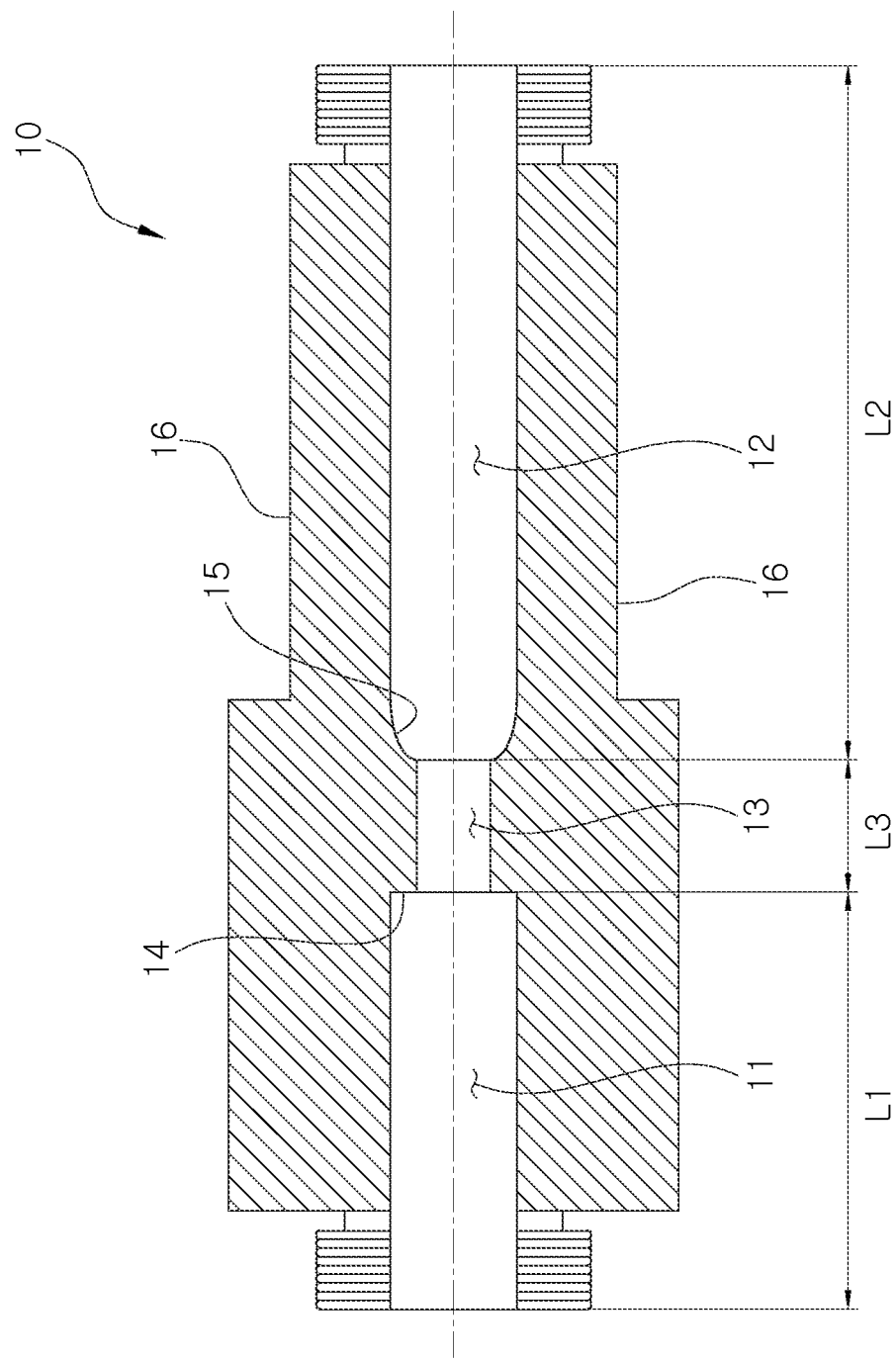
FIG. 2 is a cross-sectional view illustrating a reactor of a submerged plasma generator according to an embodiment of the present invention.

Referring to FIGS. 1 and 2, a submerged plasma generator 1 according to an embodiment of the present invention (hereinafter, referred to as "submerged plasma generator 1) is a plasma generating apparatus which may generate a large amount of micro-nano bubbles in a working fluid moving in one direction and continuously generate plasma using the same and includes a reactor 10.

The reactor 10 is manufactured with a dielectric material having a permittivity and has a tubular structure through which a working fluid may pass. For example, translucent polycrystalline ceramics, engineering plastics, acryl, tantalum, quartz, pyrex, fiber glass, crystal, and the like may be applied as dielectric materials. To be more specific, the reactor 10 is formed to have a tubular structure in which an inlet through which the working fluid flows in is formed at one side, an outlet through which the working fluid is discharged is formed at the other side, and a flow path which connects the inlet and the outlet along a lengthwise direction therein to allow the working fluid to pass therethrough are formed.

Figure 3:
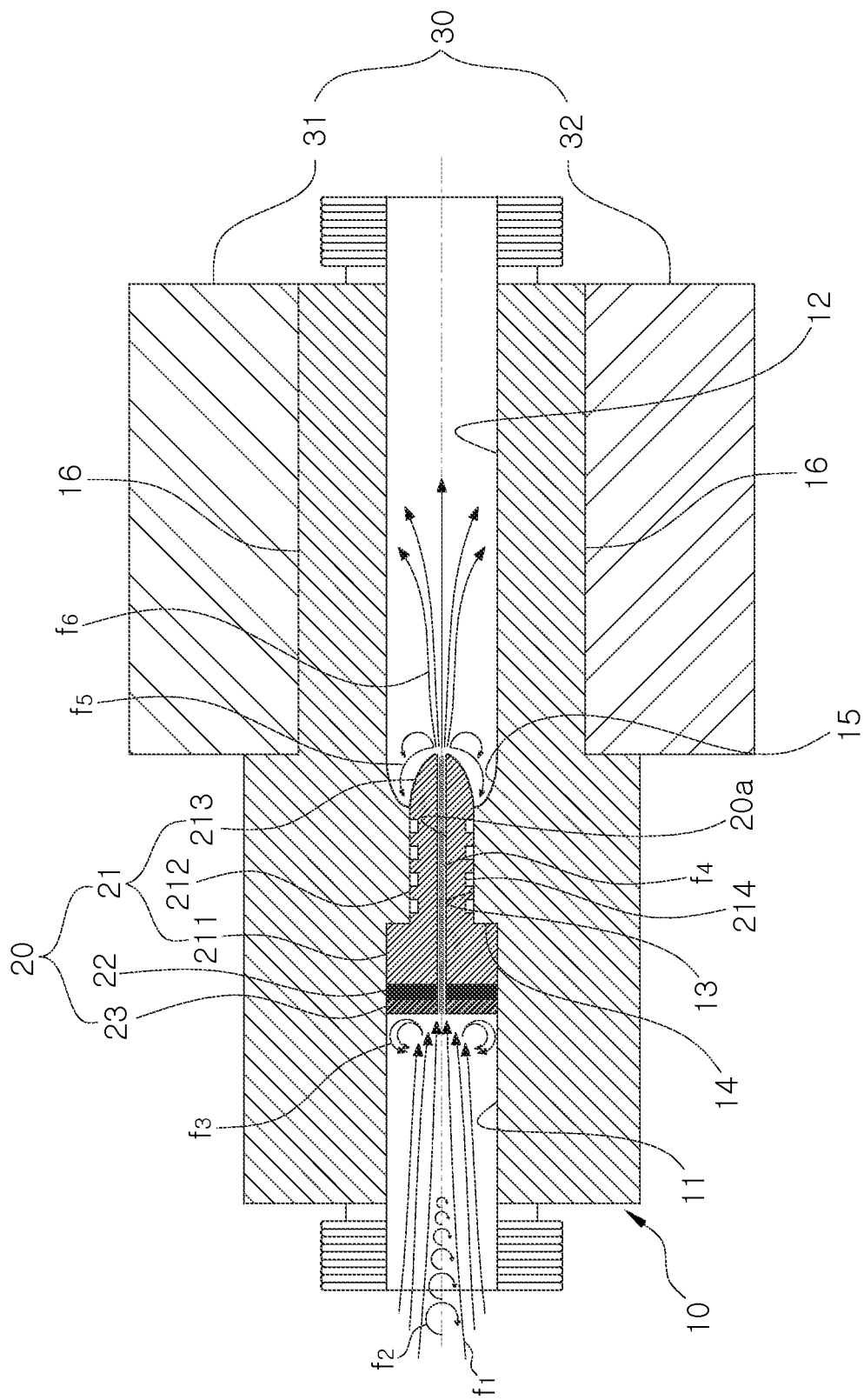
FIG. 3 is a cross-sectional view illustrating a state in which a dielectric insert is disposed in a reactor of a submerged plasma generator according to an embodiment of the present invention.

Referring to FIGS. 2 and 3, the flow path is divided into a plurality of sections having different lengths or inner diameters and may be partitioned into a plurality of spaces by a dielectric insert 20 accommodated therein, which will be described below.

To be more specific, the flow path includes a first flow path 11 which is connected to an inlet to allow the working fluid to flow in and generates cavitation by the dielectric insert 20, a second flow path 12 which is connected to an outlet and is disposed to be opposite to the first flow path 11 along an axial direction of the reactor 10 and allows the working fluid which passes through the dielectric insert 20 to be ionized by exposure to the plasma to flow, and a third flow path 13 which is formed between the first flow path 11 and the second flow path 12 to connect the first flow path 11 and the second flow path 12 and is formed with a smaller inner diameter than that of the first flow path 11 and the second flow path 12 and accommodates the dielectric insert 20.

Here, the second flow path 12 in which the working fluid ionized by exposure to the plasma flows is formed in an oval structure.

To be more specific, the first flow path 11 in which cavitation is generated and the second flow path 12 in which the working fluid ionized by exposure to the plasma flows may be formed with different shapes.

Figure 4:
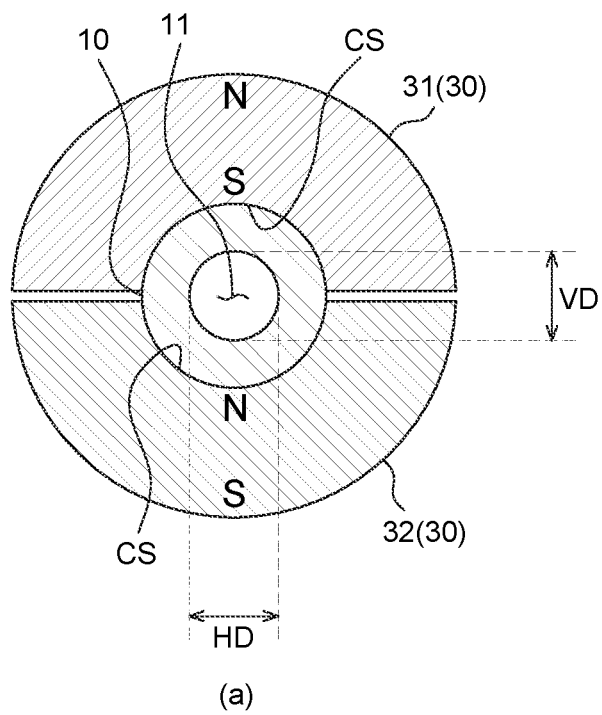
FIG. 4 is a view schematically illustrating a cross-section of a first flow path and a second flow path of a submerged plasma generator according to an embodiment of the present invention.
Figure 4:
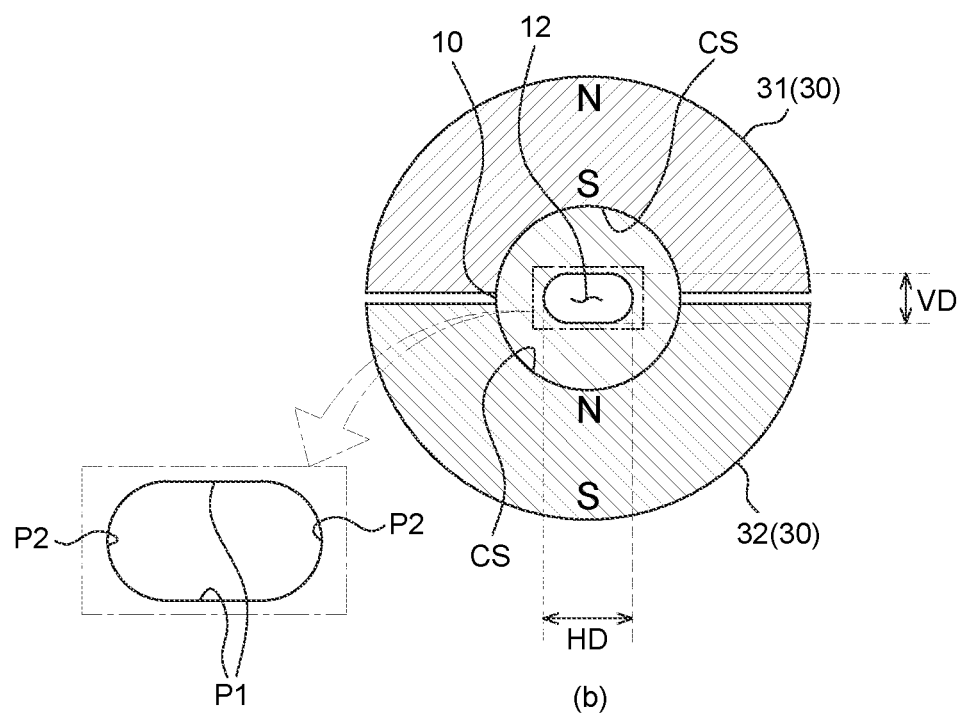

Referring to FIG. 4, the first flow path 11 in which cavitation is generated is formed in a circular structure in which a horizontal diameter HD and a vertical diameter VD are the same (see FIG. 4A) and the second flow path 12 in which the ionized working fluid flows may be formed in an oval structure in which the horizontal diameter HD is larger than the vertical diameter VD (FIG. 4B). In this case, the second flow path 12 may be formed to have a size to be accommodated in an area of the first flow path 11. To be more specific, the horizontal diameter HD of the second flow path 12 corresponds to a horizontal diameter HD of the first flow path 11 and the vertical diameter VD of the second flow path 12 may be formed to be smaller than the vertical diameter VD of the first flow path 11. However, the first flow path 11 and the second flow path 12 are not necessarily formed with different shapes, but if necessary, the same shape may be applied.

In the meantime, the second flow path 12 may be formed in a track type oval structure.

To be more specific, the second flow path 12 may be formed in a track type oval structure including a plurality of flat sections P1 disposed to be opposite to each other in a vertical direction and a plurality of curved sections P2 disposed to be opposite to each other in a horizontal direction.

Accordingly, ions separated by the ion separation unit 30 to be described below move to the second flow path 12 formed in the track type oval structure and is closely attached to the plurality of curved sections P2, which may maximize the ion separation efficiency.

However, the second flow path 12 is not necessarily limited thereto and if necessary, may vary to a circular structure or a polygonal structure.

Referring to FIGS. 2 and 3 again, a length L2 of the second flow path 12 may be formed to be longer than a length L1 of the first flow path 11 and a length L3 of the third flow path 13 and longer than a length obtained by connecting the length of the first flow path 11 and the length of the third flow path 13. By doing this, a magnetic field section formed in the second flow path 12 is formed to be longer by an ion separation unit 30 to maximize ion separation efficiency.

For example, the flow path is formed to have a shape corresponding to an external appearance of the dielectric insert 20, but one section of the flow path in which the dielectric insert 20 is accommodated and one section of the dielectric insert 20 corresponding thereto may be formed in a polyhedral structure. By doing this, the dielectric insert 20 is prevented from being rotated in the flow path and a position of a through-hole 20a formed in a metallic insert 22 and a holding insert 23 to be described below and a position of a through-hole 20a formed in the dielectric insert 20 are prevented from being deviated from each other. Further, an inner diameter of the first flow path 11 and an inner diameter of the second flow path 12 may be formed to have different sizes. By doing this, when an operator inserts the dielectric insert 20 into the flow path, the confusion of the first flow path 11 and the second flow path 12 may be prevented. However, the flow path is not necessarily limited to this shape but may be modified in various forms.

Further, a locking protrusion 14 and a guide surface 15 may be formed in the reactor 10 which forms a flow path.

To be more specific, the locking protrusion 14 to which the dielectric insert 20 is caught to be supported along the moving direction of the working fluid may be formed between the first flow path 11 and the third flow path 13. Further, the guide surface 15 which is in contact with the working fluid ejected from the dielectric insert 20 to flow back to the third flow path 13 to guide the movement of the working fluid may be formed between the second flow path 12 and the third flow path 13.

Here, the guide surface 15 may be formed to have a structure with a curved surface bent in an arc shape toward a direction that the working fluid flows back or an inclined surface inclined with a straight line shape, so as to minimize the resistance due to the contact with the working fluid. Accordingly, the guide surface may smoothly guide the working fluid which is ejected from the dielectric insert 20 to flow back to the dielectric insert 20 and minimize the friction between the backwardly flowing working fluid and an inner surface of the reactor 10 to prevent the damage of the reactor 10.

Further, a seating support groove 16 in which the ion separation unit 30 may be seated may be formed on an outer surface of the reactor 10.

The seating support groove 16 may be formed on an outer surface of the reactor 10 corresponding to the second flow path 12 and may be formed to be dented with a predetermined depth toward the flow path from the outer surface of the reactor 10. The seating support groove 16 may be formed at one side and the other side of the reactor 10 along a direction perpendicular to an axial direction of the reactor 10 so that a first magnetic substance 31 and a second magnetic substance 32 of the ion separation unit 30 to be described below are provided to be opposite to each other. Accordingly, the ion separation unit 30 seated in the seating support groove 16 is disposed in a position corresponding to the second flow path 12 and restrictively moves to the axial direction of the reactor 10. For example, the seating support groove 16 may be formed with the same length as a section where the second flow path 12 is formed. Therefore, a length of the seating support groove 16 which is formed along the lengthwise direction of the reactor 10 is longer than a length of a section where the first flow path 11 and the second flow path 12 are formed. By doing this, a magnetic field section of the ion separation unit 30 is increased so that an ion separation effect may be improved.

Further, at one end portion and the other end portion of the reactor 10 at which the inlet and the outlet are formed, a plurality of fastening units with threads of screw formed on an outer circumferential surface is provided for the connection with the other components. For example, a length of the fastening unit close to the inlet may be longer than a length of a fastening unit close to the outlet to withstand the high-pressure working fluid flowing into the reactor 10. Further, an inner diameter of the inlet may be larger than an inner diameter of the outlet. However, the length and the size of the inner diameter of the fastening unit are not limited thereto and may be modified in various forms and structures.

Further, a packing member (not illustrated) which maintains airtightness between the other components and the fastening units may be provided in each fastening unit of the reactor 10 to prevent the leakage of working fluid during the connection with the other components. For example, the packing member may be formed as an O-ring (an O-shaped rubber ring) or a gasket. However, the packing member is not necessarily limited to this shape but may be modified in various forms.

A probe insertion hole 41 into which a metallic probe 40 to be described below is inserted may be further formed in the reactor 10. The probe insertion hole 41 is formed to have a size corresponding to an outer surface of the probe 40 and may be formed on a surface of the reactor 10 to pass through the reactor 10 so as to be connected to the second flow path 12.

Further, an opening/closing member (not illustrated) which selectively opens/closes the probe insertion hole 41 may be further provided in the reactor 10.

The opening/closing member may include an insertion unit which is inserted into the probe insertion hole 41 and a support unit which is provided at an outside of the insertion unit to be supported on an outer surface of the reactor 10 when the insertion unit is inserted into the probe insertion hole 41. For example, the opening/closing member may be formed of the same dielectric material as the reactor 10 or formed of an airtight member with a predetermined elastic force.

Accordingly, when the metallic probe 40 is not provided in the reactor 10, an operator inserts the opening/closing member in the probe insertion hole 41 to close the probe insertion hole 41 so that it is possible to prevent the working fluid from flowing into the probe insertion hole 41.

However, the opening/closing member is not necessarily limited thereto and may be modified in various forms within the condition which can perform the same function.

Further, the submerged plasma generator 1 includes a dielectric insert 20.

Figure 6:
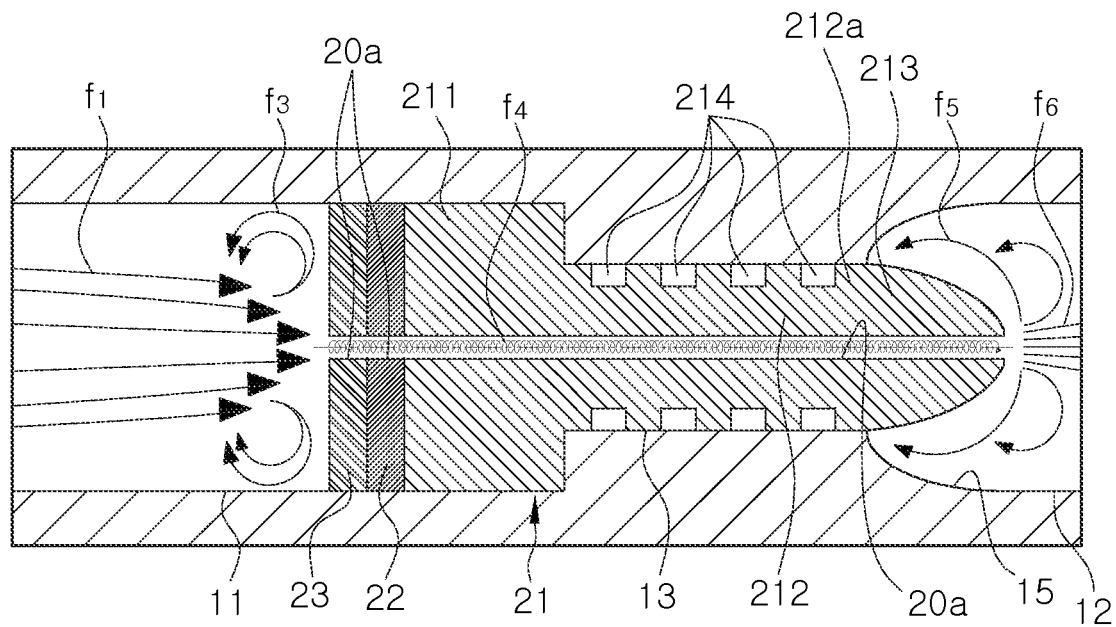
FIG. 6 is a cross-sectional view schematically illustrating a state in which a dielectric insert of a submerged plasma generator according to an embodiment of the present invention is disposed in a flow path.
Figure 6:
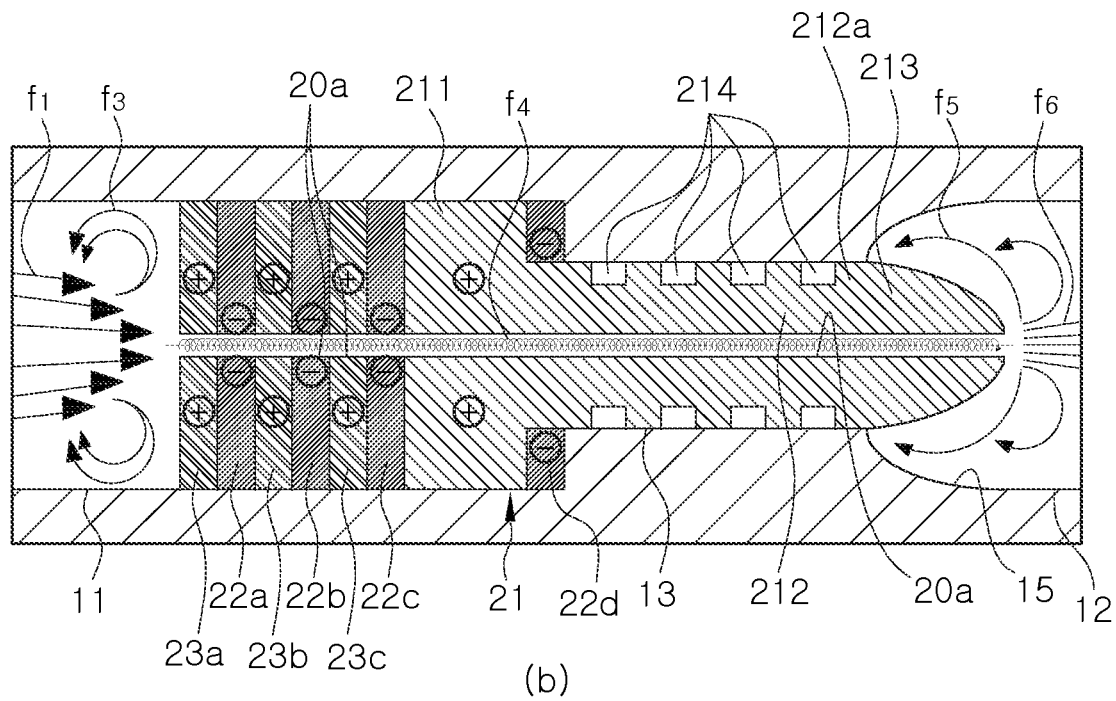

Referring to FIGS. 3 and 6, the dielectric insert 20 is configured to be inserted into the reactor 10 to provide an environment required to generate the plasma by cavitation that electrons are emitted from the working fluid.

To be more specific, the dielectric insert 20 is disposed in the flow path to partition the flow path into one space and the other space. Further, in the dielectric insert 20, a through-hole 20a which connects the plurality of partitioned spaces (a first flow path 11 and a second flow path 12) to each other and has a cross-sectional width relatively smaller than the first flow path 11 is formed. Here, a ratio of a diameter of the first flow path 11 and a diameter of the through-hole 20a may be desirably applied to be 10:1. However, the ratio of the diameter of the first flow path 11 and the diameter of the through-hole 20a is not necessarily limited thereto, but may be applied to be at least any one of 10:0.5 to 10:4. Further, a metallic catalyst (a metallic insert 22) which causes the friction with the working fluid flowing into the through-hole 20a when the working fluid flows in to emit electric charges of the same polarity to the micro-nano bubbles which pass through the through-hole 20a together with the working fluid is provided at one side of the dielectric insert 20 accommodated in the first flow path 11.

Accordingly, as illustrated in FIG. 6, a large amount of micro-nano bubbles of 5 μm or less with a surface potential of a negative charge by the cavitation generated between the first flow path 11 and the through-hole 20a may be generated in the working fluid which flows into one space (first flow path 11) of the reactor 10. Here, a negative potential is sharply increased on surfaces of a large amount of micro-nano bubbles which is generated by the cavitation to be contracted in a size of 5 μm or less in accordance with a zeta potential characteristic. Further, a large amount of micro-nano bubbles which flows into the through-hole 20a together with the working fluid to pass through the metallic catalyst (metallic insert 22) continuously collapses due to repulsive force between the charges (− charges) of a surface potential and the charges (− charges) of the same polarity released from the metallic catalyst to generate a plasma with a high density. By doing this, the working fluid which is ejected through the dielectric insert 20 to move to the other space (second flow path 12) of the flow path is exposed to the high-density plasma to be ionized.

The dielectric insert 20 will be described in more detail.

Figure 7:
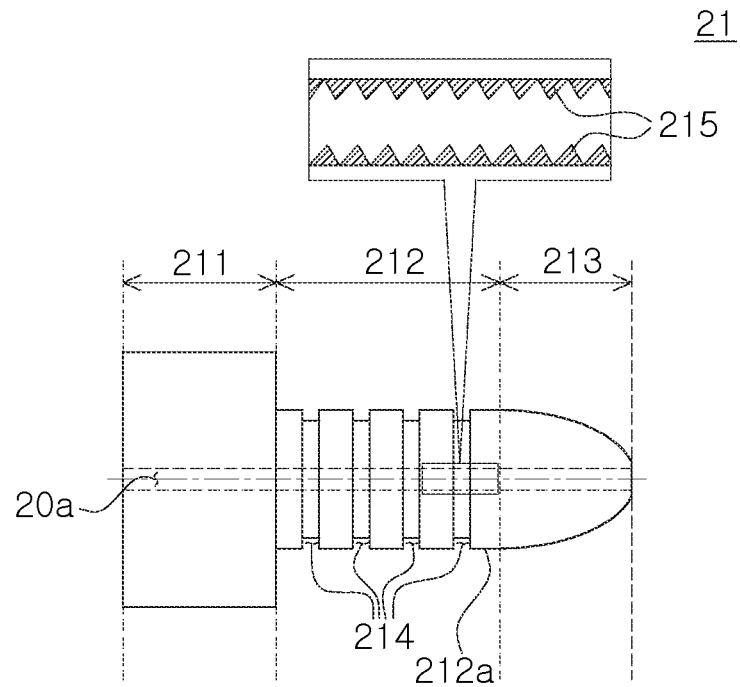
FIGS. 7 to 10 are views illustrating a dielectric substance of a submerged plasma generator according to an embodiment of the present invention.
Figure 7:
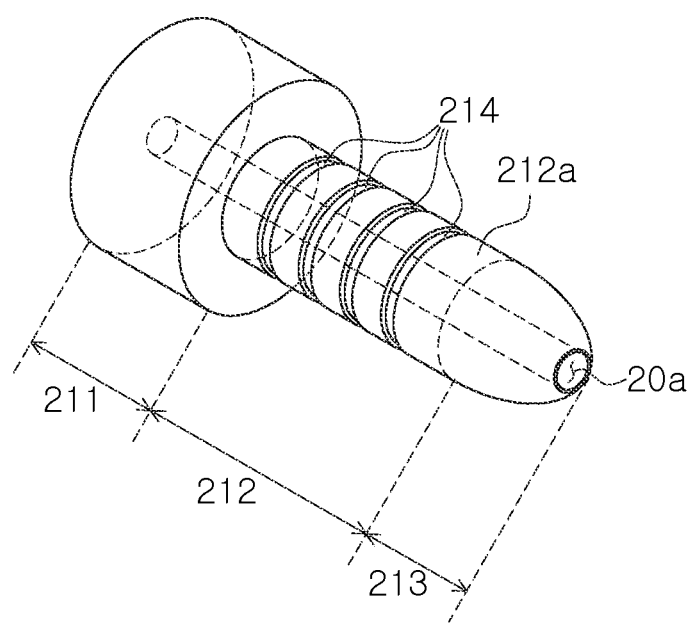

Referring to FIGS. 6 and 7, the dielectric insert 20 is formed of a dielectric material with a predetermined permittivity and has a size corresponding to the first flow path 11 and the third flow path 13 to be accommodated over the first flow path 11, the second flow path 12, and the third flow path 13 and has a dielectric substance 21 in which the through-hole 20a is formed therein. For example, various dielectric materials having a predetermined permittivity, such as engineering plastics, acryl, quartz, pyrex, ceramics, fiber glass, and crystal may be applied for the dielectric substance 21.

The dielectric substance 21 may be divided into a first part 211, a second part 212, and a third part 213 depending on a position in the flow path.

The first part 211 is formed to have a size corresponding to the first flow path 11 to be accommodated in the first flow path 11. When the working fluid flows in, the first part 211 is pressurized by the working fluid so that one surface is caught by the locking protrusion 14 to be supported. For example, the first part 211 may be formed to have a cross-sectional size larger than the second part 212 and the third part 213 to be described below. That is, the first part 211 is formed to have a size corresponding to the first flow path 11 to be supported on an inner circumferential surface of the reactor 10 which forms the first flow path 11 and is caught by the locking protrusion 14 formed in the reactor 10 along the moving direction of the working fluid to be supported so that even though the working fluid flows therein, the first part 211 may stably maintain the fixed state without flowing due to the pressure of the working fluid.

The second part 212 extends with a predetermined length along an axial direction from the first part 211 and has a size corresponding to the third flow path 13 to be accommodated in the third flow path 13. For example, the second part 212 may be desirably formed to be longer than the first part 211.

Further, in the second part 212, a collection groove 214 in which the working fluid flowing backwardly is accommodated may be formed.

The collection groove 214 may be formed to be dented with a predetermined depth toward the inside of the second part 212 from the outer circumferential surface so that the working fluid which is ejected from the third part 213 to be described below to backwardly flow to the second part 212 along the surface of the third part 213 may flow therein.

Figure 8:
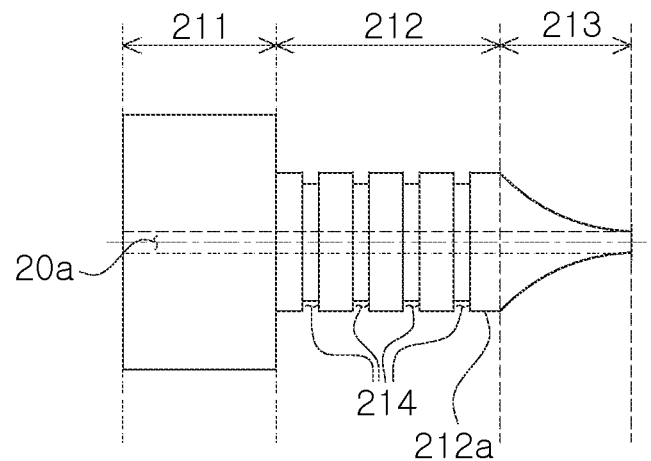
Figure 8:
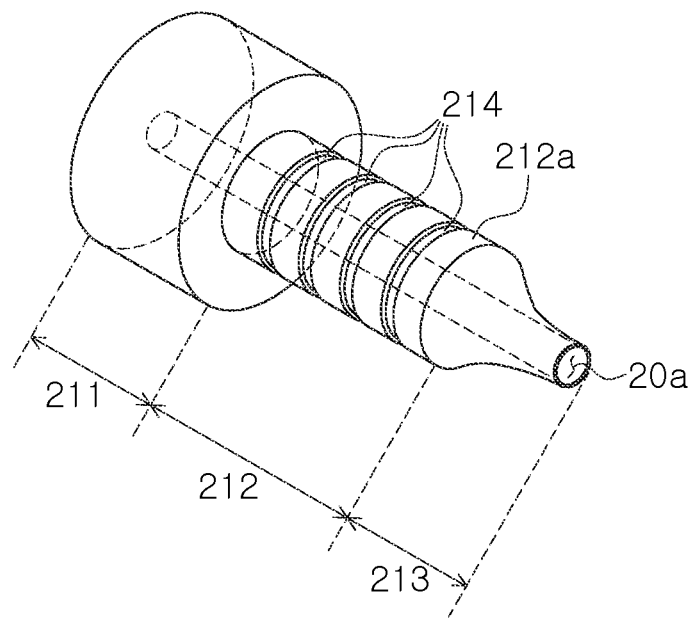
Figure 9:
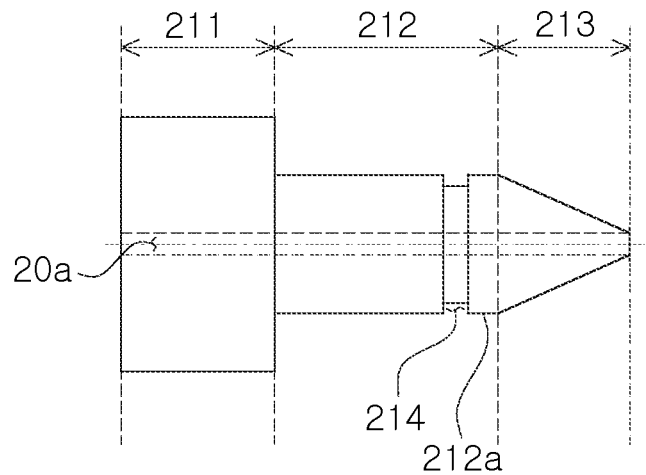
Figure 9:
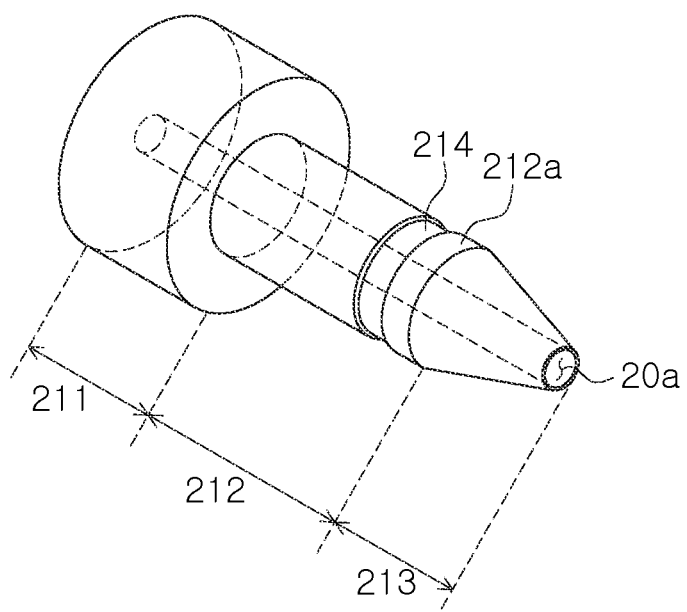
Figure 10:
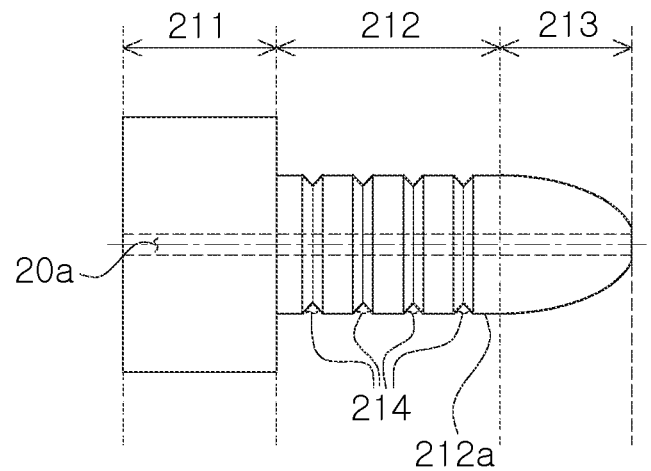
Figure 10:
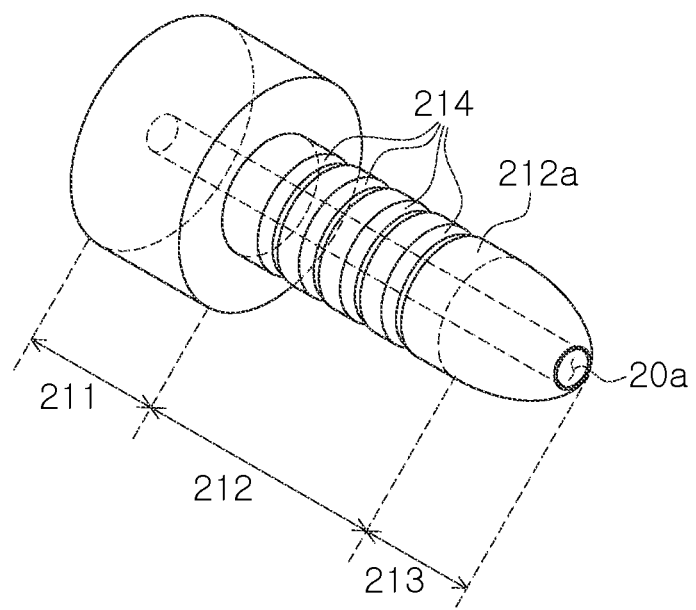

The collection groove 214 may be formed on the outer surface of the second part 212 as a singular form as illustrated in FIG. 9, or a plurality of collection grooves may be formed along the lengthwise direction of the second part 212 as illustrated in FIGS. 7, 8, and 10. Here, the plurality of collection grooves 214 formed along the lengthwise direction of the second part 212 may be formed in at least two positions along the lengthwise direction of the second part 212 and may be disposed to be spaced apart from each other with a constant interval.

In the meantime, referring to FIGS. 7 to 10, the collection grooves 214 may be formed in a position spaced apart from the third part 213 with a predetermined distance therebetween. That is, a block portion 212a is provided between the collection groove 214 formed to be adjacent to the third part 213 and the third part 213 to separate the collection groove 214 and the third part 213 and thus the flowing of the working fluid which flows in the collection groove 214 along the surface of the third part 213 may be minimized.

Further, the collection groove 214 may be formed to be etched with various shapes such as a V-shape or a U-shape, as illustrated in FIG. 10.

By doing this, the collection groove 214 provides a predetermined space for accommodating the working fluid to reduce the flowing backward of the working fluid to the first part 211. Further, the collection groove 214 is formed such that the working fluid easily flows in and out to allow the working fluid accommodated in the collection groove 214 to be gathered with the working fluid ejected through the third part 213. As a result, the generation of the plasma may be accelerated.

However, the collection groove 214 is not necessarily formed in the second part 212, but if necessary, the collection groove 214 may be selectively formed in the dielectric substance 21.

Referring to FIGS. 6 and 7 again, the third part 213 extends along the axial direction from the second part 212 with a predetermined length and is formed to have the same external appearance as the second part 212 to be accommodated in the second flow path 12. Further, the third part 213 may be formed to have a structure in which a size of the diameter is gradually reduced toward the moving direction of the working fluid.

That is, the third part 213 extends from the second part 212 to be exposed to the second flow path 12 and has a surface structure in which the size of the diameter is gradually reduced toward the moving direction of the working fluid to smoothly guide the working fluid which is ejected from the end portion to backwardly flow to the second part 212, thereby accelerating the plasma reaction.

Further, the surface of the third part 213 exposed to the second flow path 12 may be formed to have a curved shape which is bent toward the outside. Therefore, the working fluid which is ejected through the third part 213 to backwardly flow may move to the second part 212 along the surface of the third part 213 formed with a curved shape.

However, the surface shape of the third part 213 is not limited thereto and may vary to have various structures and shapes.

Referring to FIG. 8, the surface of the third part 213 may be formed with a curved shape bent concavely toward the inside. Therefore, the working fluid which is ejected through the third part 213 to backwardly flow may move to the second part 212 along the surface of the third part 213 formed with a curved shape bent concavely toward the inside. Further, the working fluid which is ejected from the third part 213 to backwardly flow may be accelerated by a surface shape structure of the third part 213 described above and the flow of the working fluid continuously ejected from the third part 213.

Further, referring to FIG. 9, the surface of the third part 213 may be formed as an inclined surface. Therefore, the working fluid which is ejected through the third part 213 to backwardly flow may move to the second part 212 along the surface of the third part 213 with an inclined shape.

In the meantime, a vortex protrusion 215 may be further formed inside the dielectric substance 21 with the through-hole formed therein.

Referring to FIG. 7, the vortex protrusion 215 may spirally protrude on the entire inner surface of the dielectric substance 21 along the lengthwise direction of the dielectric substance 21 so as to generate the vortex in the working fluid which passes through the through-hole 20a. By doing this, the generation of micro-nano bubbles in the dielectric substance 21 may be further activated, and the collapse of micro-nano bubbles may be further accelerated.

Figure 11:
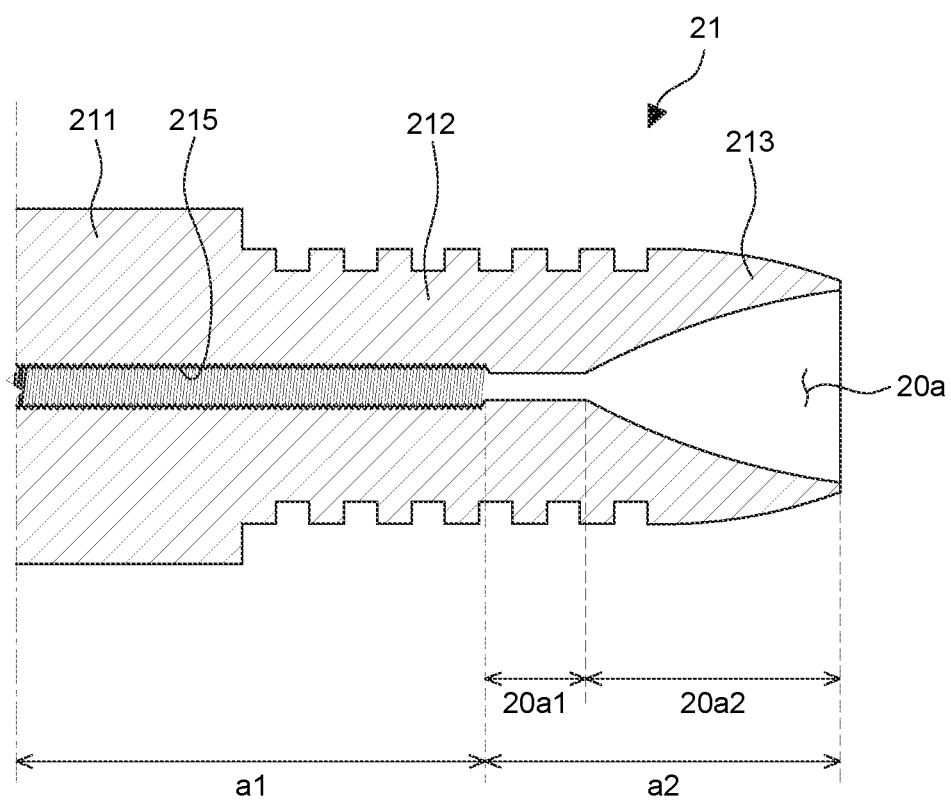
FIG. 11 is a cross-sectional view schematically illustrating another embodiment of a dielectric substance of a submerged plasma generator according to an embodiment of the present invention.

Further, referring to FIG. 11, the vortex protrusion 215 formed in the dielectric substance 21 may be formed only in one section of the dielectric substance 21.

To be more specific, the vortex protrusion 215 formed in the dielectric substance 21 may be formed over a part of the first part 211 and the second part 212 of the dielectric substance 21.

For example, a flow path section a1 in which the vortex protrusion 215 is formed and a flow path section a2 in which the vortex protrusion 215 is not formed may be formed in the dielectric substance 21 at a ratio of 1.3:1.

Here, the through-hole 20a which forms the flow path section a2 in which the vortex protrusion 215 is not formed may be formed with a structure which is gradually broadened along the moving direction of the working fluid.

To be more specific, the through-hole 20a which forms the flow path section a2 in which the vortex protrusion 215 is not formed may include a first through-hole portion 20a1 which communicates with the flow path section a1 in which the vortex protrusion 215 is formed to be formed in the second part 212 and maintains the same diameter as a predetermined length and a second through-hole portion 20a2 which extends from the first through-hole portion 20a1 to be formed over the second part 212 and the third part 213 and has a diameter which is gradually increased along the moving direction of the working fluid.

For example, a connection part of the first through-hole portion 20a1 and the second through-hole portion 20a2 may be curved so as to permit the working fluid to smoothly flow and the second through-hole portion 20a2 may be formed with a diameter which is gradually increased along the moving direction of the working fluid and may be curved toward a radial direction of the dielectric substance 21.

Further, referring to FIGS. 3 and 6, the dielectric inset 20 may further include a metallic insert 22 and a holding insert 23.

The metallic insert 22 is accommodated in the first flow path 11 and is disposed in front of the dielectric substance 21 while being in contact with the dielectric substance 21 through one surface and when the working fluid flows therein, the metallic insert 22 causes the friction with the working fluid to emit electrons. For example, the metallic insert 22 may be formed of various metals, such as gold (Au), silver (Ag), nickel, copper, aluminum, platinum, palladium, and titanium. Further, the metallic insert 22 may be formed with a predetermined thickness and formed to have a size of an external appearance corresponding to the first flow path 11. Further, inside of the metallic insert 22, a through-hole 20a through which the working fluid may pass may be formed. For example, a spiral groove is formed inside the through-hole 20a, so that when the working fluid passes, a vortex phenomenon (screw phenomenon) may be induced in the working fluid.

The holding insert 23 may be accommodated in the first flow path 11 to be disposed in front of the metallic insert 22 and maintained to be in contact with the metallic insert 22. When the working fluid flows in, the holding insert 23 may be formed of a dielectric material having a predetermined permittivity so as to hold electrons discharged from the metallic insert 22. That is, the holding insert 23 may serve to accumulate electrons generated from the metallic insert 22. For example, the holding insert 23 may be formed of a dielectric material having a predetermined permittivity, such as engineering plastics (PC), acryl, quartz, pyrex, ceramics, fiber glass, and crystal. Further, the holding insert 23 may be formed with a predetermined thickness and formed to have a size of an external shape corresponding to the first flow path 11. Further, inside of the holding insert 23, a through-hole 20a through which the working fluid passes may be formed. For example, a spiral groove is formed inside the through-hole 20a, so that when the working fluid passes, a vortex phenomenon (screw phenomenon) may be induced in the working fluid.

Further, the submerged plasma generator 1 includes an ion separation unit 30.

Figure 12:
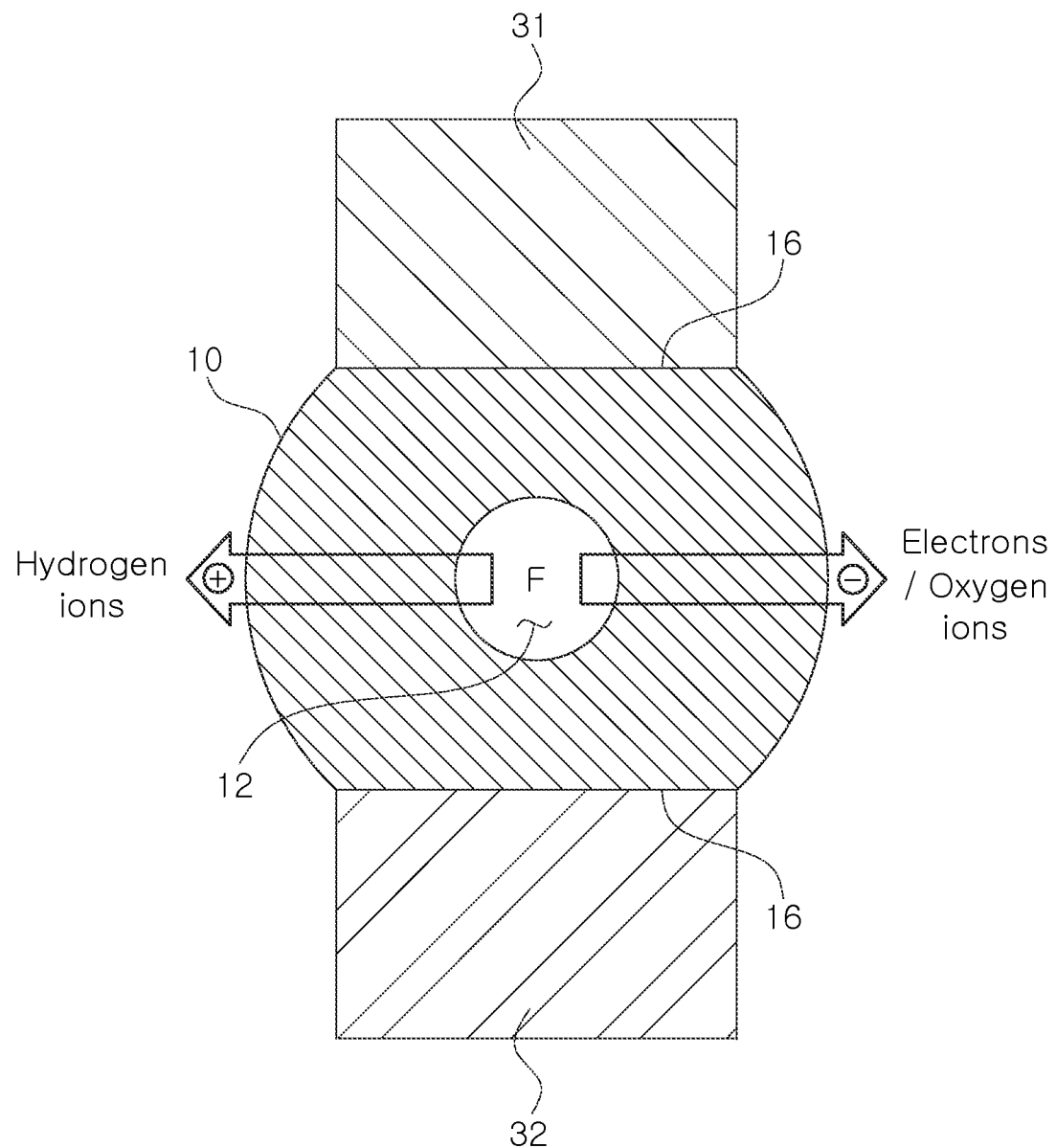
FIG. 12 is a view schematically illustrating a moving direction of ions separated by an ion separation unit in a submerged plasma generator according to an embodiment of the present invention.

Referring to FIGS. 3 and 12, the ion separation unit 30 is provided on an outer surface of the reactor 10 corresponding to the other space (second flow path 12) of the flow path in which the working fluid passing through the dielectric insert 20 is accommodated. The ion separation unit 30 forms a magnetic field in the second flow path 12 to separate $H^+$ ions and $OH^-$ ions from the working fluid which is ionized by the exposure to the plasma by passing through the dielectric insert 20.

Here, as the working fluid supplied to the reactor 10, hard water ($H_2O$) with a specific resistance of $10^4$ $\Omega \cdot cm$, a mixed fluid in which hard water and heavy water ($D_2O$) are mixed, or a mixed fluid in which hard water and methanol or hard water and ethanol are mixed may be applied. However, the working fluid is not limited thereto, but may be modified to various fluids under the condition that the plasma is generated when the working fluid passes through the submerged plasma generator 1.

Figure 13:
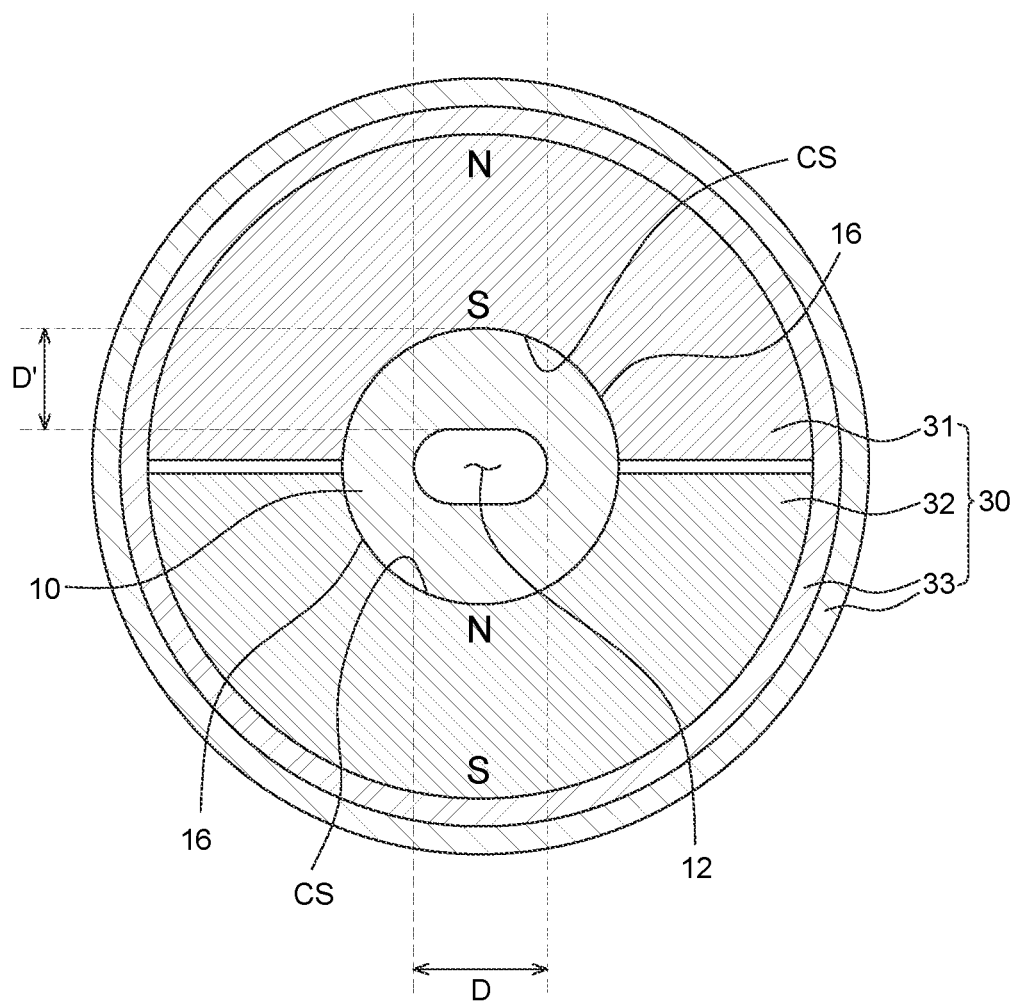
FIG. 13 is a cross-sectional view schematically illustrating a state in which a shielding unit is applied in a submerged plasma generator according to an embodiment of the present invention.
Figure 14:
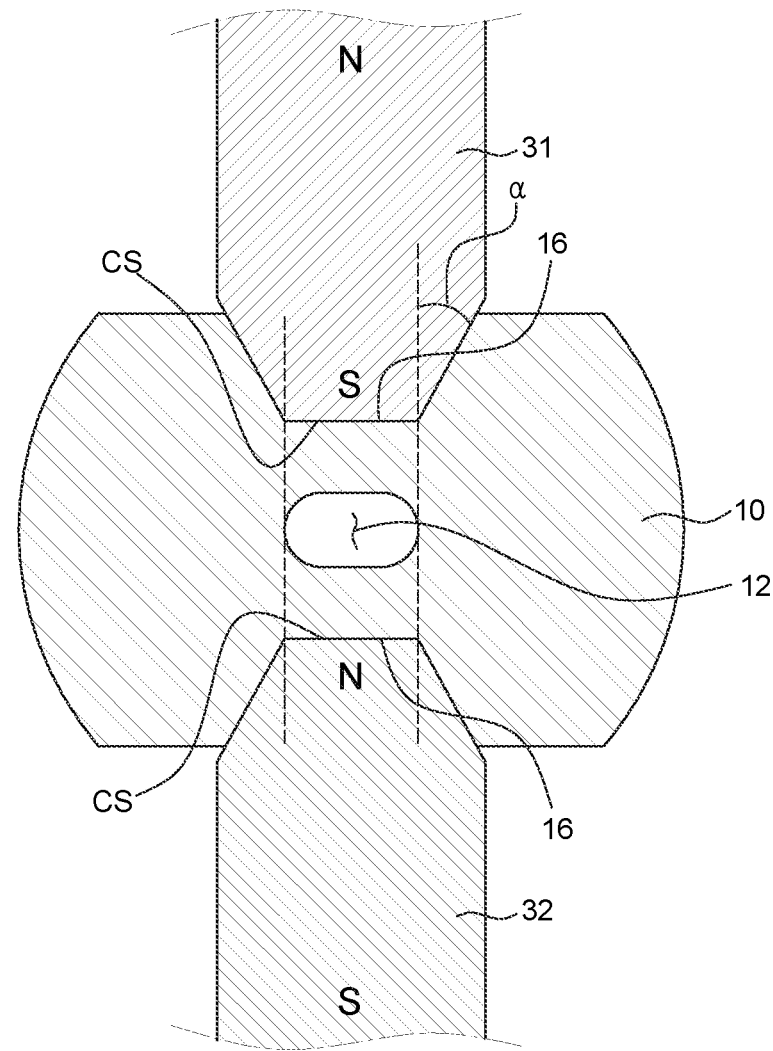
FIGS. 14 and 15 are cross-sectional views schematically illustrating a state in which a plurality of magnetic substances is applied in a wedge structure in a submerged plasma generator according to an embodiment of the present invention.

In the meantime, referring to FIGS. 13 and 14, the contact surface CS of the ion separation unit 30 which is disposed to be in contact with an outer surface of the reactor 10 may correspond to a diameter D of the other space (second flow path 12) of the flow path or may be formed to have a width larger than the diameter D of the other space (second flow path 12) of the flow path.

That is, the contact surface CS disposed to be in contact with the seating support groove 16 may be formed to have the same planar area as the second flow path 12 or may be formed to have a planar area larger than the second flow path 12.

Here, the contact surface CS in contact with the seating support groove 16 may be spaced apart from an inner surface of the reactor 10 which forms the other space (second flow path 12) of the flow path with a predetermined distance D' therebetween to further improve the intensity of the magnetic force applied to the second flow path 12.

To be more specific, the contact surface CS may be disposed to be spaced apart from the inner surface of the reactor 10 with a distance of at least 4 to 11 mm therebetween. The distance between the contact surface CS and the inner surface of the reactor 10 is not limited thereto but may vary depending on a material of the reactor 10, a hardness of the reactor 10, or a size of the reactor 10 and the flow path.

The ion separation unit 30 will be described in more detail.

Referring to FIGS. 13 and 14, the ion separation unit 30 may include a plurality of magnetic substances 31 and 32 which is seated in the seating support groove 16 to be disposed to be opposite to each other with the second flow path 12 therebetween along the vertical direction.

When the plurality of magnetic substances 31 and 32 is provided on the outer surface of the reactor 10, the plurality of magnetic substances may be formed to enclose the entire outer surface of the reactor 10 as illustrated in FIG. 13 or may be formed to enclose a part of the outer surface of the reactor 10 as illustrated in FIG. 14. For example, each magnetic substance 31 and 32 may be formed in a semi-cylindrical structure or a rod-shaped structure.

The plurality of magnetic substances may include a first magnetic substance 31 and a second magnetic substance 32.

To be more specific, the plurality of magnetic substances may include a first magnetic substance 31 which is disposed at an upper side of the reactor 10 such that an S polarity is directed to the second flow path 12 and a second magnetic substance 32 which is disposed at a lower side of the reactor 10 to be opposite to the first magnetic substance 31 such that an N polarity is directed to the second flow path 12. However, the plurality of magnetic substances is not necessarily limited thereto, but unlike illustrated in the drawings, the first magnetic substance 31 and the second magnetic substance 32 may be disposed in opposite positions. By doing this, the direction of the ions which are separated by the ion separation unit 30 to move together with the working fluid may be changed.

Further, the plurality of magnetic substances 31 and 32 may be formed in a wedge structure.

Referring to FIG. 14, the plurality of magnetic substances 31 and 32 may be formed with a wedge structure in which a width in a cross-section is gradually reduced toward the second flow path 12 to minimize a loss of the magnetic force and improve the property of the magnetic force. Here, the contact surfaces CS of the plurality of magnetic substances 31 and 32 are formed to have a size corresponding to a diameter of the second flow path 12 and an outer surface of each magnetic substance 31 and 32 which forms the wedge structure may be formed to be inclined at a predetermined angle α. For example, the outer surface of each magnetic substance 31 and 32 may be formed to be inclined at an angle between 20 and 30 degrees. The seating support groove 16 formed on the outer surface of the reactor 10 may be formed to have a shape corresponding to the outer surface of each magnetic substance 31 and 32 formed with the wedge structure.

For reference, when a magnetic field is formed in the second flow path 12 with wide flat magnetic substances in which a contact surface CS exceeds a diameter range of the second flow path 12, an overall magnetic field may be high, but a magnetic flux density per unit area applied to the second flow path 12 may be lowered. A magnitude of the magnetic flux density may be inversely proportional to a square of the distance between the magnetic substances.

Accordingly, as described above, the first magnetic substance 31 and the second magnetic substance 32 are formed in a wedge structure to minimize an interval between the first magnetic substance 31 and the second magnetic substance 32 and matches each contact surface CS of the first magnetic substance 31 and the second magnetic substance 32 with an area of the second flow path 12, to obtain a high magnetic flux density. Further, the loss of the magnetic force is minimized to form a uniform magnetic field between the first magnetic substance 31 and the second magnetic substance 32, thereby improving an ion separation efficiency.

For example, the plurality of magnetic substances 31 and 32 may be applied by a neodymium permanent magnet or a samarium cobalt-based permanent magnet and a magnetic flux of 10,000 Gauss or higher may be applied to the second flow path 12. However, the submerged plasma generator does not necessarily form a magnetic field using a permanent magnet type magnetic substance as described above, but if necessary, may form a magnetic field using a magnetic field forming unit which can obtain a high magnetic flux density, such as a superconductivity. Further, the plurality of magnetic substances may be disposed, unlike illustrated in the drawings, such that the first magnetic substance 31 and the second magnetic substance 32 may be disposed in opposite positions. By doing this, the direction of the ions which are separated by the ion separation unit 30 to move together with the working fluid may be changed.

Further, the ion separation unit 30 may further include a magnetic substance support unit 34.

Figure 15:
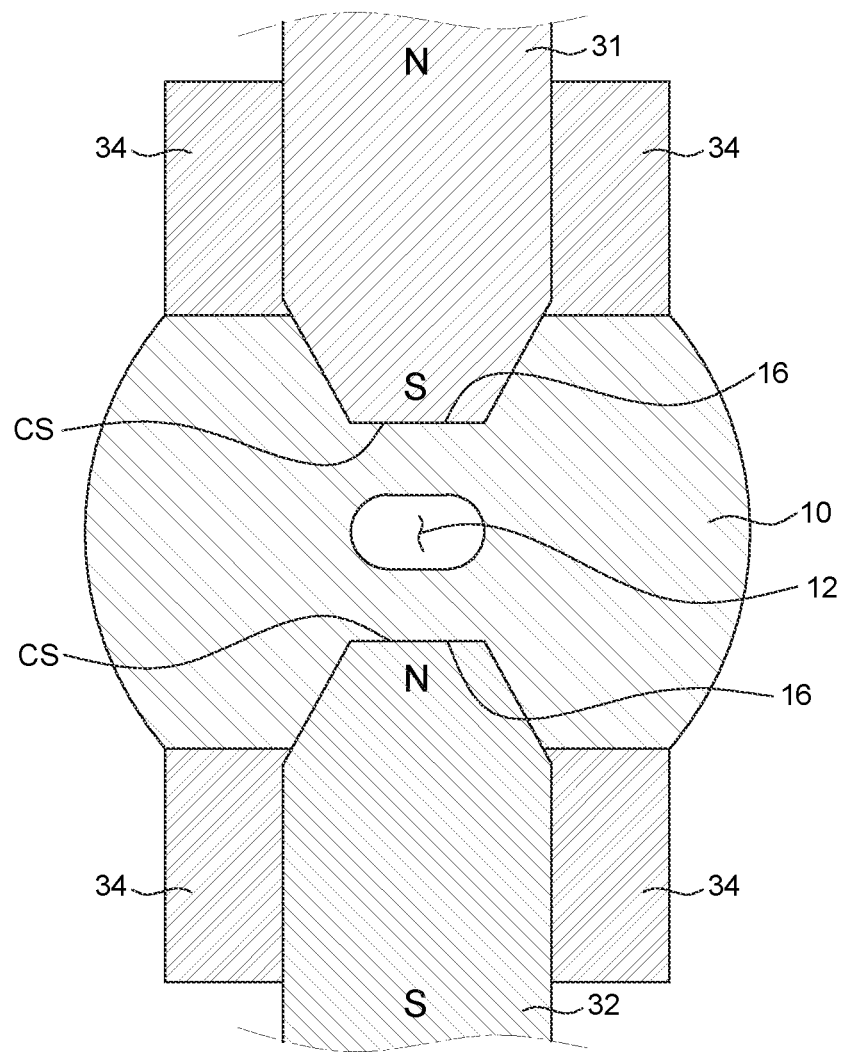

Referring to FIG. 15, the magnetic substance support unit 34 may support both side surfaces of the magnetic substances 31 and 32 and restrict the flow of the magnetic substances 31 and 32 in the horizontal direction.

Further, the ion separation unit 30 may further include a shielding unit 33.

Figure 16:
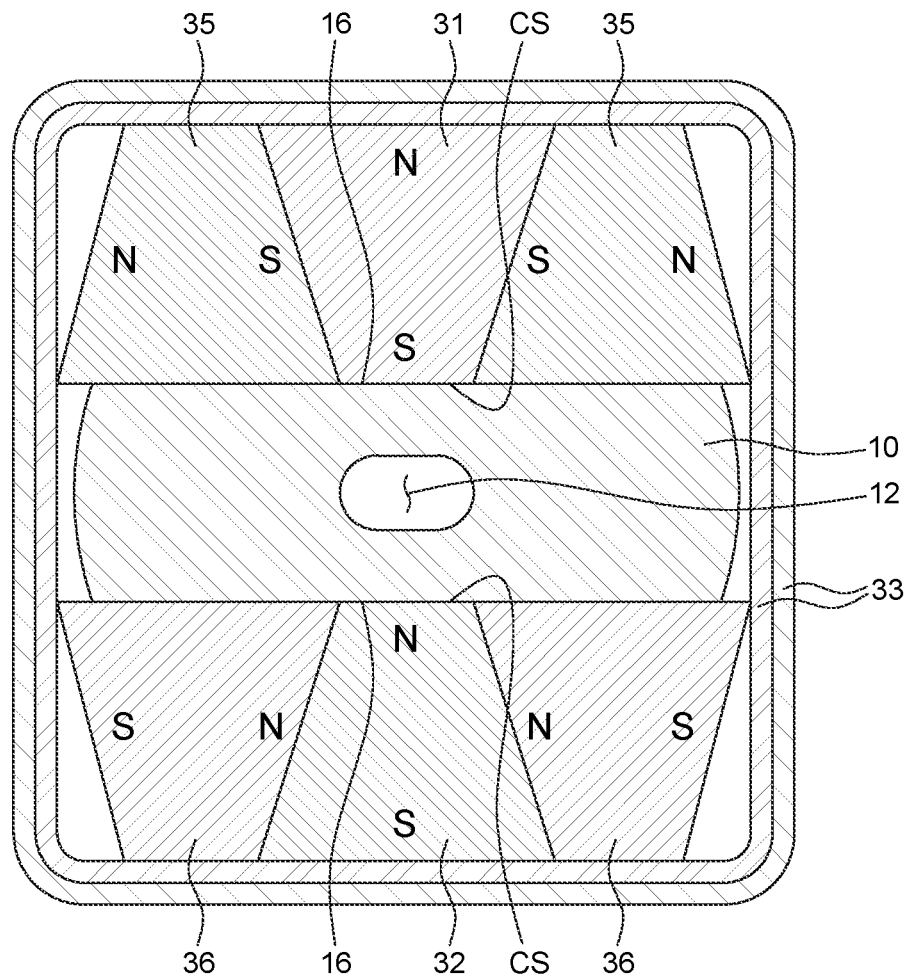
FIG. 16 is a cross-sectional view schematically illustrating a state in which an auxiliary magnetic substance is applied in a submerged plasma generator according to an embodiment of the present invention.

Referring to FIGS. 13 and 16, the shielding unit 33 is provided on an outer side of the first magnetic substance 31 and the second magnetic substance 32 so as to enclose the first magnetic substance 31 and the second magnetic substance 32 to shield a magnetic field formed by the first magnetic substance 31 and the second magnetic substance 32.

For example, the shielding unit 33 may be formed of a metallic material which is capable of shielding a magnetic force so that the magnetic force is not leaked to an outer space and may be formed with a multi-layered structure along a radial direction of the reactor 10.

Further, the shielding unit 33 supports the first magnetic substance 31 and the second magnetic substance 32 to restrict the flow of the first magnetic substance 31 and the second magnetic substance 32 and a plurality of components may be fastened with each other to be selectively detached from the first magnetic substance 31 and the second magnetic substance 32.

For example, the shielding unit 33 may include a housing and a bracket. The housing is formed with a hollow double pipe shape and is inserted in an axial direction of the reactor 10 to support outer surfaces of the plurality of magnetic substances 31 and 32. The bracket forms a through-hole through which the reactor 10 passes to be coupled to both open ends of the housing to close the opening of the housing and air-tightly seals between the housing and an outer surface of the reactor, seal the inner space of the housing in which the plurality of magnetic substances 31 and 32 is accommodated, and support both ends of the plurality of magnetic substances 31 and 32.

However, the shielding unit 33 is not necessarily limited thereto, but may be applied as various types such as a cover type which is configured by an upper mold and a lower mold to enclose the plurality of magnetic substances 31 and 32 by coupling the upper mold and the lower mold or a panel type which encloses the plurality of magnetic substances 31 and 32 by coupling the plurality of panel type members to each other.

Further, the ion separation unit 30 may further include an auxiliary magnetic substance which maximizes a magnetic force of the first magnetic substance 31 and the second magnetic substance 32.

Referring to FIG. 16, the auxiliary magnetic substance may include a third magnetic substance 35 and a fourth magnetic substance 36.

The third magnetic substance 35 is disposed on both side surfaces of the first magnetic substance 31 which is disposed at an upper side of the reactor 10 such that an S polarity is directed to the second flow path 12 and the S polarity is directed to the first magnetic substance 31. The fourth magnetic substance 36 is disposed on both side surfaces of the second magnetic substance 32 which is disposed at a lower side of the reactor 10 such that an N polarity is directed to the second flow path 12 and the N polarity is directed to the second magnetic substance 32. Here, the third magnetic substance 35 and the fourth magnetic substance 36 may have the same magnitude of magnetic force as the first magnetic substance 31 and the second magnetic substance 32.

That is, a plurality of auxiliary magnetic substances (a third magnetic substance 35 and a fourth magnetic substance 36) with the same magnitude of magnetic force as the first magnetic substance 31 and the second magnetic substance 32 is disposed on both side surfaces of the first magnetic substance 31 and the second magnetic substance 32 which are disposed to be opposite to each other with the second flow path 12 therebetween. The plurality of auxiliary magnetic substances (a third magnetic substance 35 and a fourth magnetic substance 36) is disposed such that the same polarity as the polarity of the first magnetic substance 31 and the second magnetic substance 32 which is directed to the second flow path 12 is directed to the first magnetic substance 31 and the second magnetic substance 32 to maximize the magnetic force of the first magnetic substance 31 and the second magnetic substance 32.

For example, when the first magnetic substance 31 is magnetized at 7,000 Gauss, if the third magnetic substance 35 with the same magnitude (7,000 Gauss) of magnetic force is disposed on both side surfaces of the first magnetic substance 31 such that the S polarity is directed to the first magnetic substance 31, the first magnetic substance 31 may generate a magnetic force of 14,000 Gauss toward the second flow path 12.

Further, the submerged plasma generator 1 may further include a branch unit 50.

Figure 17:
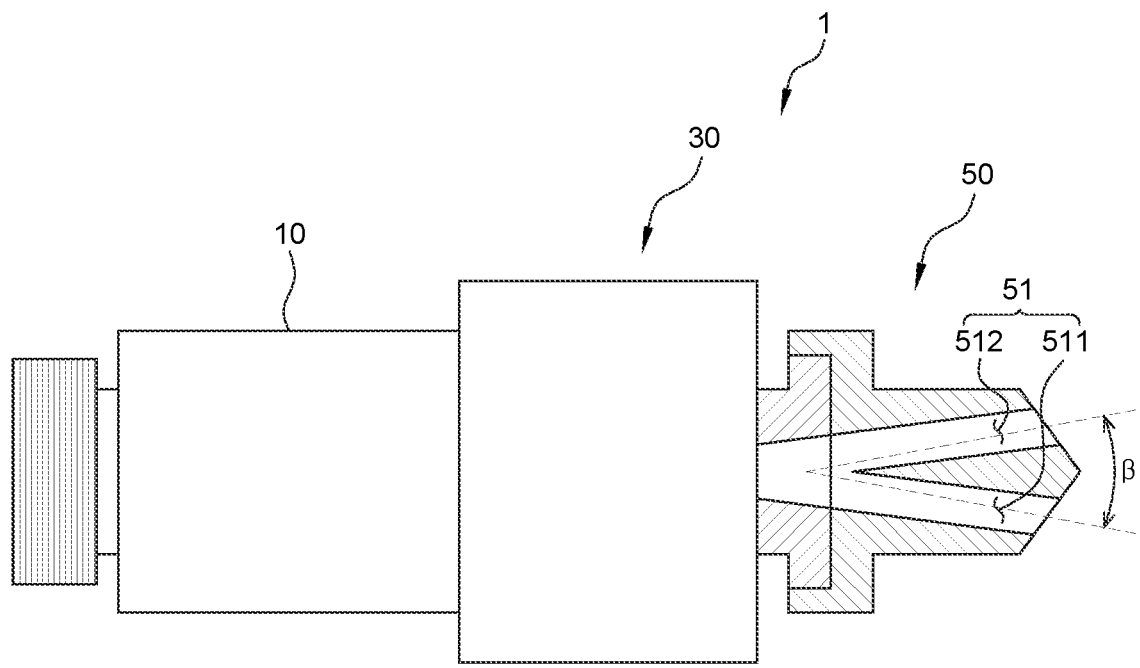
FIG. 17 is a cross-sectional view schematically illustrating a state in which a branch unit is applied in a submerged plasma generator according to an embodiment of the present invention.

Referring to FIG. 17, the branch unit 50 is installed at the other side of the reactor 10 and includes a plurality of branched flow paths 51 which communicates with the second flow path 12 to be branched at a predetermined angle β to branch the working fluid and ions flowing through the second flow path 12 to a plurality of directions. By doing this, the branch unit 50 may branch the $H^+$ ions and $OH^-$ ions separated by the ion separation unit 30 and the working fluid to different directions by means of the plurality of branched flow paths 51.

The plurality of branched flow paths 51 may include a first branched flow path 511 which guides the movement of the working fluid including $H^+$ ions and a second branched flow path 512 which is disposed to be opposite to the first branched flow path 511 along a horizontal direction and guides the movement of the working fluid including $OH^-$ ions.

Here, the plurality of branched flow paths 51 may be formed to be branched at a predetermined angle, like a shape of "<" along a moving direction of the working fluid from the other end of the reactor 10 at which a magnetic field section ends. By doing this, a time when unstable ions (hydrogen and oxygen (that is, electrons)) separated due to the magnetic force when plasma is generated are stabilized (recombined) is minimized to maximize a hydrogen production efficiency. However, the plurality of branched flow paths 51 is not necessarily limited to a structure extending from the other end of the reactor 10 at which the magnetic field section ends, but may be formed to be branched and extend at a predetermined angle along the moving direction of the working fluid from the magnetic field section.

For example, the first branched flow path 511 and the second branched flow path 512 may be branched at an angle of 26.5 degrees to 30 degrees.

Further, the submerged plasma generator 1 may further include a metallic probe 40.

Figure 5:
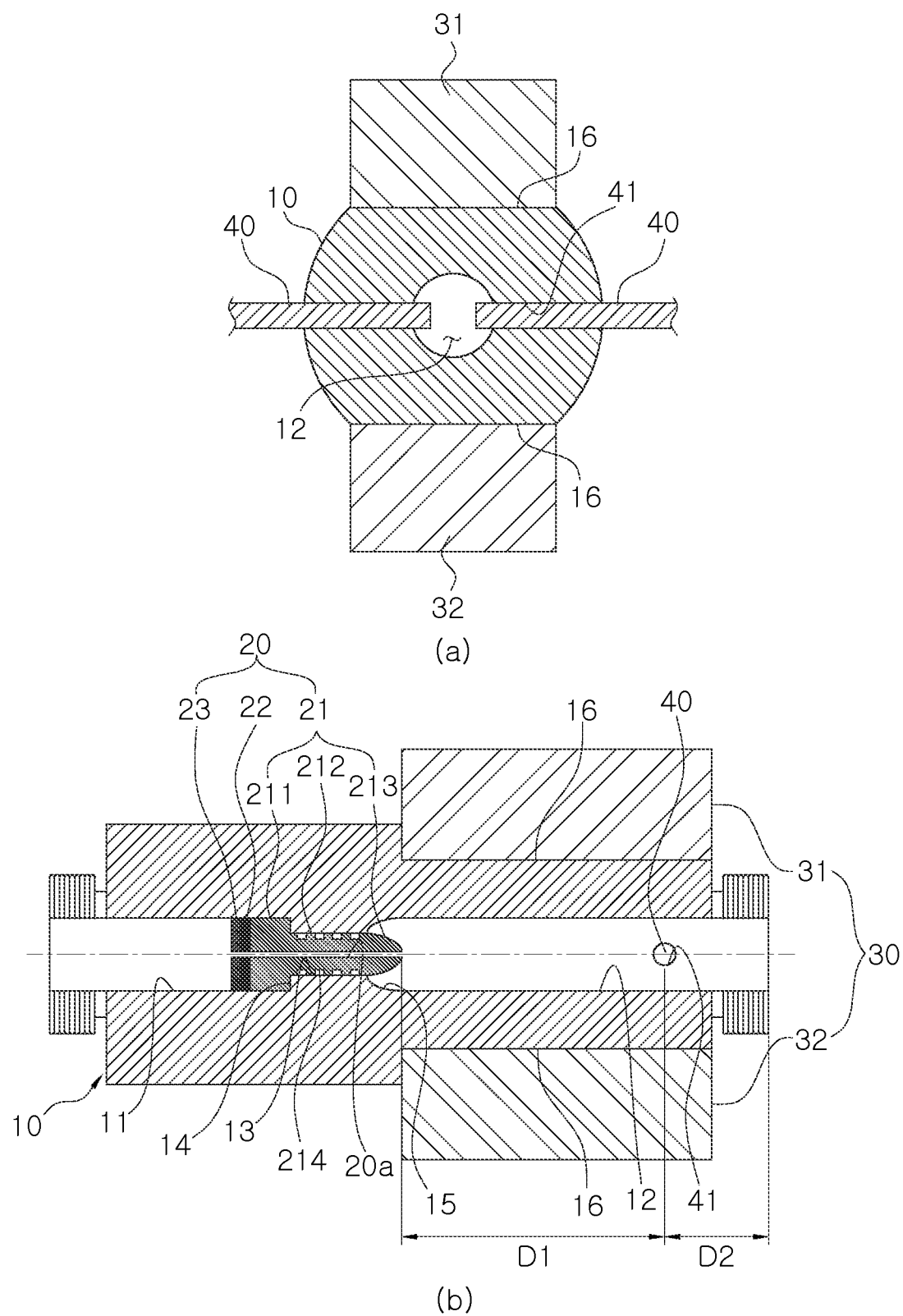
FIG. 5 is a view schematically illustrating a state in which a metallic probe is installed in a submerged plasma generator according to an embodiment of the present invention.

Referring to FIG. 5A, a plurality of metallic probes 40 is provided to be disposed to be opposite to a direction perpendicular to a direction in which the first magnetic substance 31 and the second magnetic substance 32 are disposed to be opposite and passes through the reactor 10 so that some of the metallic probes may be accommodated in the other space (second flow path 12) of the flow path. Accordingly, when a capacitor and the like is connected to the plurality of metallic probes 40, a high voltage electric energy may be acquired. For example, the metallic probe 40 may be formed of various metal materials such as silver, copper, aluminum, gold, and nickel.

In the meantime, referring to FIG. 5B, in the other space (second flow path 12) of the flow path, a distance D1 between the end portion of the dielectric insert 20 and the metallic probe 40 may be longer than a distance D2 between the metallic probe 40 and an end portion of the reactor 10.

Further, even though not illustrated in the drawings, the submerged plasma generator 1 may further include a water purifying unit (not illustrated), a power unit (not illustrated), a pump (not illustrated), a storage tank (not illustrated), a flow rate control unit (not illustrated), an accumulator (not illustrated), a fluid moving unit (not illustrated), a measurement unit (not illustrated), and a control panel (not illustrated).

The water purifying unit may purify the working fluid. Here, the working fluid may use hard water, a mixed fluid of hard water and heavy water, a hydrocarbon oil, a mixed fluid of hard water and methanol or a mixed fluid of hard water and ethanol and if the hard water is used, the working fluid may be purified in the range of a specific resistance of $10^4$ Ω·cm or higher. Further, when a mixed fluid in which hard water and heavy water are mixed is used as a working fluid, heavy water may be desirably mixed by 0.01% to 100% of hard water. Further, hydrocarbon oil or mineral oil is used, it is desirable that the viscosity is 40 or less. However, the working fluid is not limited thereto, but may vary to various fluids which may generate the plasma when the working fluid passes through the submerged plasma generator 1.

The power unit may supply power to supply the working fluid purified in the water purifying unit into the reactor 10. That is, the power unit rotates a pump to be described below which is disposed at one side of the power unit to transmit the working fluid to the reactor 10 at a predetermined pressure. For example, the power unit may be applied as a motor and the like.

The pump is disposed at one side of the power unit and receives the power from the power unit to transmit the working fluid to the reactor 10 at a predetermined pressure. For example, as the pump drives, the working fluid stored in the storage tank to be described below is transmitted from the storage tank to the pump and the working fluid transmitted to the pump may be supplied to the reactor 10.

The storage tank may store the working fluid which passes through the reactor 10 and a temperature control unit to be described below and supply the working fluid to the pump. For example, in the storage tank, a partition which stabilizes a state of circulating and flowing-in working fluid may be provided. Further, in the storage tank, a heat exchanger (not illustrated) may be further provided to control the temperature.

The flow rate control unit is disposed in the middle introducing from the storage tank to the reactor 10 to control a flow rate of the working fluid which is introduced into the reactor 10. For example, the flow rate control unit may be disposed between the pump and the reactor 10.

The accumulator may be installed between the flow rate control unit and the reactor 10 and prevent a pulsation phenomenon that since the working fluid does not constantly flow, the plasma is momentarily cut off and then generated again. For example, two or more accumulators may be provided to reduce the pulsation phenomenon.

The fluid moving unit is formed as a pipe which connects the above-described devices such as the water purifying unit, the reactor 10, and the storage tank to each other and includes a flow path in which the working fluid circulates. For example, the fluid moving unit may be formed of a dielectric material.

The measurement unit is disposed in any one of the inlet and the outlet of the reactor 10, and the fluid moving unit and may measure a pressure and a temperature of the working fluid. By doing this, the measured pressure and temperature of the working fluid may be used to control the pressure and the temperature of the working fluid. For example, when the temperature and the pressure of the working fluid measured at the inlet of the reactor 10 do not reach a pressure and a temperature sufficient to generate the pressure, the pump (not illustrated) is controlled to increase the pressure. Further, the measurement unit may stop reducing the temperature of the working fluid by the temperature control unit (not illustrated) to be described below. Further, the measurement unit disposed in the fluid moving unit which is introduced into the temperature control unit measures the temperature of the working fluid to measure a temperature of the working fluid which rises in accordance with a frictional heat and plasma generated in the reactor 10. The measured temperature may be used as data for controlling a temperature of the working fluid in the temperature control unit.

The control panel may include a power device which turns on or off the submerged plasma generator 1 and a manipulation device which adjusts the pressure and the temperature of the working fluid. The control panel may further include a display panel which displays a pressure and a temperature measured by the above-described measurement unit.

Hereinafter, flow of the working fluid, operations of inserts associated with the flow of the working fluid, and a formation process and a collapse process of micro-nano bubbles will be described in detail with reference to FIGS. 3 and 6.

For reference, components for describing the flow of the working fluid, the operations of inserts associated with the flow of the working fluid, and the process of formation process and the collapse process of the micro-nano bubbles will be described with the same reference numerals used for description of the submerged plasma generator 1 for the convenience of description and the same or repeated description will be omitted.

First, the flow of the working fluid, the operations of inserts associated with the flow of the working fluid, and the formation process and collapse process of micro-nano bubbles through the dielectric insert 20 will be described.

Referring to FIGS. 3 and 6A, the dielectric insert 20, the metallic insert 22, and the holding insert 23 may be sequentially inserted through the first flow path 11 of the reactor 10. When the dielectric insert 20 is inserted, the third part 213 may be inserted first into the first flow path 11.

When the submerged plasma generator 1 operates, the high-pressure working fluid flows into the inlet of the reactor 10. In this case, since the working fluid flows in at a high pressure, the dielectric insert 20, the metallic insert 22, and the holding insert 23 are sequentially brought into contact with each other.

The working fluid may form first flows f1 which are introduced into the reactor 10 and linearly flows toward the through-hole and a second flow f2 in which vortex is formed between the first flows f1. Since a diameter of the through-hole 20a formed in the dielectric insert 20, the metallic insert 22, and the holding insert 23 is much smaller than a diameter of the first flow path 11 of the reactor 10 through which the working fluid flows, the working fluid which is close to the through-hole 20a of the holding insert 23, but does not flow into the through-hole 20a may have a third flow f3 which forms a vortex. The third flow f3 may be incorporated into the first flow f1 again to flow into the through-hole 20a.

The working fluid flowing into the through-hole 20a may form a fourth flow f4 which forms a vortex by a spiral groove formed in the through-hole 20a of the metallic insert 22, the holding insert 23, and the dielectric insert 20. The working fluid introduced into the through-hole 20a may flow while causing friction with the metallic insert 22. Many electrons are discharged from the metallic insert 22 by the friction. Some of the electrons emitted from the metallic insert 22 flows together with the working fluid and the other of the emitted electrons is accumulated in the holding insert 23.

The working fluid flowing into the through-hole 20a may form micro-nano bubbles by the cavitation due to the very narrow diameter. More micro-nano bubbles may be formed while passing through the through-hole 20a. Further, the formed micro-nano bubbles remain in the working fluid and may collapse when the working fluid passes through the through-hole 20a of the dielectric insert 20. Plasma is mainly generated in the through-hole 20a of the second part 212 of the dielectric insert 20 and the second flow path 12 by the collapse of micro-nano bubbles and electrons charged to the working fluid.

Here, the micro-nano bubble generally refers to bubbles having a diameter of 50 μm or less. Micro-nano bubbles are formed by being surrounded by a gas-liquid interface, and the surface tension of water acts on the interface. The surface tension acts as a force which compresses the inside of the bubble. The increase in pressure in the bubble according to an environmental pressure may be theoretically calculated by the following Equation 1.

$$\Delta P = 4\sigma/D \qquad \text{[Equation 1]}$$

Here, ΔP is a degree of increased pressure, σ is a surface tension, and D is a diameter of bubble.

TABLE 1

| Diameter μm | ΔP kg/cm2 |
|---|---|
| 10 | 0.3 |
| 1 | 3 |
| 0.1 | 30 |
| ⋮ | ⋮ |
| 0 | ∞ |

Referring to Table 1, a micro-nano bubble with a diameter of approximately 10 μm has an internal pressure of approximately 0.3 atm and a micro-nano bubble with a diameter of approximately 1 μm has a pressure of approximately 3 atm. Further, the ion concentration is increased at the interface. When the micro-nano bubble collapses, ultrasonic waves of approximately 40 KHz, a high sound pressure of approximately 140 db, and instantaneous high heat from 4,000° C. to 6,000° C. occur. The micro-nano bubbles collapse due to the ultrasonic waves, the high sound pressure, and the instantaneous high heat, and suspended electrons in the working fluid to generate the plasma.

In the case of working fluid such as oil or water, when a traveling speed of the working fluid increases and a local pressure is lower than a vapor pressure, the working fluid is vaporized to cause a cavity.

Normal bubbles rise to a water surface to be ruptured on the surface, but when the bubbles have a micro (μm) nano-size close to a size of an atom or molecule, the bubbles have different behaviors or properties in the same material. The same phenomenon occurs in the bubbles. Micro-nano bubbles of 50 μm (0.05 mm) or less shrink in the water and finally disappear, and during this process, at least three successive steps: nucleation, bubble growth, and implosion decay under appropriate conditions are performed.

During this process, the micro-nano bubbles are exaggeratively grown so that the micro-nano bubbles cannot absorb the energy to maintain the micro-nano bubbles itself and are violently imploded by "rapidly collapse". The temperature and the pressure discharged during the collapse step enormously increase such that the molecules of the trapped gases break apart, which is also the basis for 'uniform ultrasonic chemistry'.

Further, the micro-nano bubbles have electric charges and move in zigzag as the micro-nano bubbles rise according to the electric field around them. In this case, the micro-nano bubbles cause slight vibration and repeat the chain reaction of compression and collapse in a short time of approximately 1 μsec (1/1,000,000 seconds) by the 'self-pressurization effect'.

Further, the self-pressurization effect is generated by force which compresses the gas by the surface tension in the micro-nano bubbles with a spherical interface and when the bubbles expand or collapse, the strong pressure and temperature in the collapsed bubbles may become high enough to trigger the nuclear reaction. At this time, the internal temperature of the micro-nano bubbles instantaneously rises to 5,500° C. comparable to the temperature of the solar surface, a collapse (implosion) speed of a wall of the micro-nano bubble is accelerated to 7,000 m/sec, and the shock wave reaches 11,000 m/sec and emits intense light reaching 20,000 K to 30,000 K (Kelvin temperature), which is the generation of plasma.

The destructive power of micro-nano bubbles is well demonstrated in everyday life related to water or other fluids. For example, cavitation occurs as the traveling speed of the fluid flowing on the surface of a propeller or a hull is increased by the rotation of the propeller in the water and a local pressure is lower than a vapor pressure. During this process, a lot of micro-nano bubbles is generated, and the generation and the collapse are continuously repeated. Tremendous energy generated whenever these micro-nano bubbles collapse damages the surfaces of metal propellers, hulls, pumps, and the like, which causes enormous obstacles to the ship's operation. The destructive force of the micro-nano bubbles has been proved by this result.

The working fluid which passes through the through-hole 20a of the dielectric insert 20 is emitted to the front of the third part 213, that is, toward the outlet of the reactor 10. A part of the emitted working fluid forms a fifth flow f5 which flows backwardly toward the second part 212 along the surface of the third part 213 and the other part of the emitted working fluid forms a sixth flow f6 which flows to the front of the third part 213.

The working fluid in accordance with the fifth flow f5 may flow into a minute gap between the third flow path 13 and the second part 212 of the dielectric insert 20. As mentioned above, a diameter of the second part 212 of the dielectric insert 20 is formed so as to correspond to the third flow path 13. Therefore, the dielectric insert 20 needs to be inserted into the reactor 10 so that the second part 212 of the dielectric insert 20 and the second flow path 12 of the reactor 10 are in close contact with each other. Otherwise, a large amount of working fluids backwardly flows through the third flow path 13 so that the efficiency of generation of the plasma may be degraded.

The working fluid which flows backwardly between the third flow path 13 and the dielectric insert 20 flows into the collection groove 214 formed in the second part 212 of the dielectric insert 20. The flowing working fluid remains in the collection groove 214 and when the sixth flow f6 becomes strong, escapes to the second flow path 12 between the third flow path 13 and the dielectric insert 20 to strengthen the sixth flow f6. In this case, the micro-nano bubbles included in the working fluid which remains in the collection groove 214 collapse to generate much more plasmas.

As described above, the collection groove 214 may perform both the functions of providing a space for remaining the backwardly flowing working fluid and strengthening the plasma generated in the second flow path 12.

Next, the flow of the working fluid, the operations of inserts associated with the flow of the working fluid, and the formation process and the collapse process of micro-nano bubbles through the dielectric insert 20 according to another embodiment will be described.

In the case of the dielectric insert 20, the metallic inserts 22a, 22b, 22c, and 22d, and the holding insert 23a, 23b, and 23c in the reactor 10 illustrated in FIG. 6B, as compared with the inside of the reactor 10 illustrated in FIG. 5A, only the length of the dielectric insert 20, the number of the metallic inserts 22a, 22b, 22c, and 22d, and the number of the holding inserts 23a, 23b, and 23c are different, but the other components are substantially the same. Therefore, a redundant description will be omitted.

Referring to FIG. 6B, the number of dielectric insert 20 inserted into the reactor 10 is one and a total number of metallic inserts 22a, 22b, 22c, and 22d is four, and a total number of holding inserts 23a, 23b, and 23c is three. However, the number of metallic inserts 22a, 22b, 22c, and 22d and holding inserts 23a, 23b, and 23c may vary depending on the necessary.

The second part 212 of the dielectric insert 20 is formed to be longer than the dielectric insert 20 illustrated in FIG. 6A. This is because a fourth metallic insert 22d is further inserted close to the second part 212 of the dielectric insert 20. Specifically, the fourth metallic insert 22d is inserted to a front surface of the dielectric insert 20 while passing through the second part 212 of the dielectric insert 20. The dielectric insert 20 is inserted into the reactor 10 with the fourth metallic insert 22d fitted on the front surface. Accordingly, the second part 212 may be formed to be long as much as the thickness of the fourth metallic insert 22d so that a starting part of the third part 213 starts from the second flow path 12. However, unlike illustrated in the drawing, the second part 212 of the dielectric insert 20 may not be formed to be longer.

The inner diameter of the fourth metallic insert 22d corresponds to an outer diameter of the second part 212 of the dielectric insert 20 and an outer diameter of the fourth metallic insert 22d corresponds to an inner diameter of the reactor 10. The fourth metallic insert 22d is in contact with the locking protrusion 14 on a front surface while being fitted into the first flow path 11 and is in contact with the first part 211 of the insert of the dielectric substance 21 on a rear surface.

After inserting the dielectric insert 20 to which the fourth metallic insert 22d is fitted into the reactor 10, the first to third metallic inserts 22a, 22b, and 22c excluding the fourth metallic insert 22d and the first to third holding inserts 23a, 23b, 23c are sequentially and alternately inserted into the reactor 10. Specifically, the dielectric insert 20, the third metallic insert 22c, the third holding insert 23c, the second metallic insert 22b, the second holding insert 23b, the first metallic insert 22a, and the first holding insert 23a are sequentially inserted into the reactor 10.

Hereinafter, the flow of the working fluid and an operation of each insert associated with the flow of the working fluid will be described.

Referring to FIG. 6, as described above, the high pressure working fluid flows into the reactor 10 in which the dielectric insert 20, the metallic inserts 22a, 22b, 22c, and 22d and the holding inserts 23a, 23b, and 23c are inserted through the first flow path 11 of the reactor 10.

As described above, the working fluid may form a first flow f1 which flows through the through-hole 20a formed in the dielectric insert 20, the metallic inserts 22a, 22b, 22c, and 22d and the holding inserts 23a, 23b, and 23c and a third flow f3 which hits the outer surface of the first holding insert 23a to form a vortex.

The working fluid flowing into the through-hole 20a may form a fourth flow f4 which becomes a vortex by a spiral groove formed on the through-hole 20a of the holding inserts 23a, 23b, and 23c, the first to third metallic inserts 22a, 22b, and 22c, and the dielectric insert 20.

The fourth flow f4 is in contact with the first holding insert 23a, the first metallic insert 22a, the second holding insert 23b, the second metallic insert 22b, the third holding insert 23c, and the third metallic insert 22c, in this order. By doing this, a large amount of electrons is introduced from the individual metallic inserts 22a, 22b, and 22c to the working fluid and some of the emitted electrons is accumulated in the holding inserts 23a, 23b, and 23c and the other of the emitted electrons is emitted through the third part 213 together with the fourth flow f4.

A part of the working fluid which is emitted toward the front side of the third part 213 forms a fifth flow f5 which backwardly flows toward the second part 212 along a surface of the third part 213. The other part of the working fluid emitted to the front side of the third part 213 forms a sixth flow f6 which flows to the front side of the third part 213.

In this case, the fifth flow f5 may flow into a minute gap between the third flow path 13 and the second part 212 of the dielectric insert 20. The working fluid which backwardly flows between the third flow path 13 and the dielectric insert 20 flows into the collection groove 214 of the dielectric insert 20.

When the sixth flow f6 becomes strong as described above, the working fluid flowing in the collection groove 214 may escape to the second flow path 12 between the third flow path 13 and the dielectric insert 20.

In the meantime, the working fluid introduced in the collection groove 214 and the working fluid which backwardly flows to the gap between the third flow path 13 and the dielectric insert 20 are in contact with the fourth metallic insert 22d disposed at an inner end of the first flow path 11 and then may form the plasma again. Specifically, the working fluid flowing in the collection groove 214 meets the working fluid which backwardly flows to the gap between the third flow path 13 and the dielectric insert 20 to flow in the first flow path 11. In this case, the working fluid is in contact with the fourth metallic insert 22d disposed at the inner end of the first flow path 11 and may be supplied with electrons.

The fourth metallic insert 22d as described above may reduce soot and damage of the dielectric insert 20 which may be caused when the working fluid flowing into the first flow path 11 through the fifth flow f5 is in contact with the dielectric insert 20. Further, the fourth metallic insert 22d supplies the electrons to the backwardly flowing fifth flow f5 to further accelerate the generation of the plasma.

Here, a diffusion groove 22d1 which diffuses electrons of the micro-nano bubbles may be further formed in the fourth metallic insert 22d.

Figure 18:
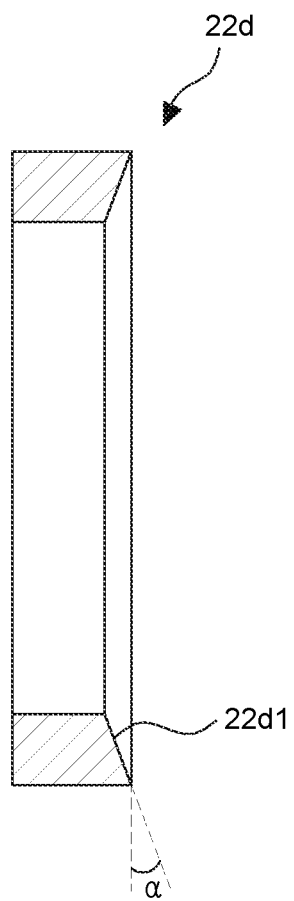
FIG. 18 is a cross-sectional view schematically illustrating another embodiment of a metallic insert of a submerged plasma generator according to an embodiment of the present invention.

To be more specific, referring to FIGS. 6B and 18, the diffusion groove 22d1 which is inclined inwardly from an end at a predetermined angle α may be formed at one side of the fourth metallic insert 22d which is in contact with a stepped portion of the reactor 10.

Therefore, the micro-nano bubbles moving to the fourth metallic insert 22d are diffused to a radial direction of the fourth metallic insert 22d by the diffusion groove 22d1 and reacts with the fourth metallic insert 22d to form plasma, thereby forming stable voltage distribution.

For example, the diffusion groove 22d1 may be formed to be inclined from one end of the fourth metallic insert 22d to the inside at an angle between 16 to 19 degrees. However, the diffusion groove 22d1 is not limited thereto and may vary with various shapes and angles under the condition which can implement the same function.

In the meantime, referring to FIG. 6, in the reactor 10, the plasma is repeatedly generated and extinguished according to the flow of the working fluid and the plasma may be simultaneously generated in a plurality of locations.

For example, the plasma generated in the reactor 10 may be classified into a first plasma, a second plasma, and a third plasma depending on the generated location.

The first plasma is a plasma generated in the working fluid contained in the collection groove 214 of the dielectric insert 20. As mentioned above, a part of the working fluid ejected from the end portion of the dielectric insert 20 backwardly flows to the collection groove 214 to be contained in the collection groove 214. The working fluid contained in the collection groove 214 rotates along a circumferential surface of the dielectric insert 20 in the collection groove 214. During this rotating process, the first plasma may be generated.

The second plasma may be generated when the working fluid in the collection groove 214 is leaked to the end portion of the third part 213. The working fluid in the collection groove 214 is gathered with the flow of the working fluid ejected from the end portion of the third part 213 to strengthen the flow of the working fluid ejected to the end portion of the third part 213. During this process, the second plasma may be generated. In the meantime, the second plasma is an example showing that the working fluid in the collection groove 214 strengthens the flow of the working fluid ejected to the outside of the third part 213 of the dielectric insert 20.

The third plasma may be generated from the working fluid which is ejected from the through-hole 20a of the dielectric insert 20 to the end portion of the third part 213. The third plasma may be generated from the inside of the through-hole 20a. The third plasma may be generated immediately after escaping the dielectric insert 20.

The third plasma may be considered as a main plasma among the plasmas generated in the reactor 10. For example, when a metallic probe 40 which is connected to a capacitor is connected to the reactor 10, the electric energy may be acquired by means of the third plasma.

Hereinafter, an application including the submerged plasma generator will be described in more detail with reference to FIGS. 19 and 20.

For reference, the same reference numerals used to describe the submerged plasma generator 1 may be used for each component to describe an application including the submerged plasma generator 1, for the convenience of description, and the same or repeated description will be omitted.

Figure 19:
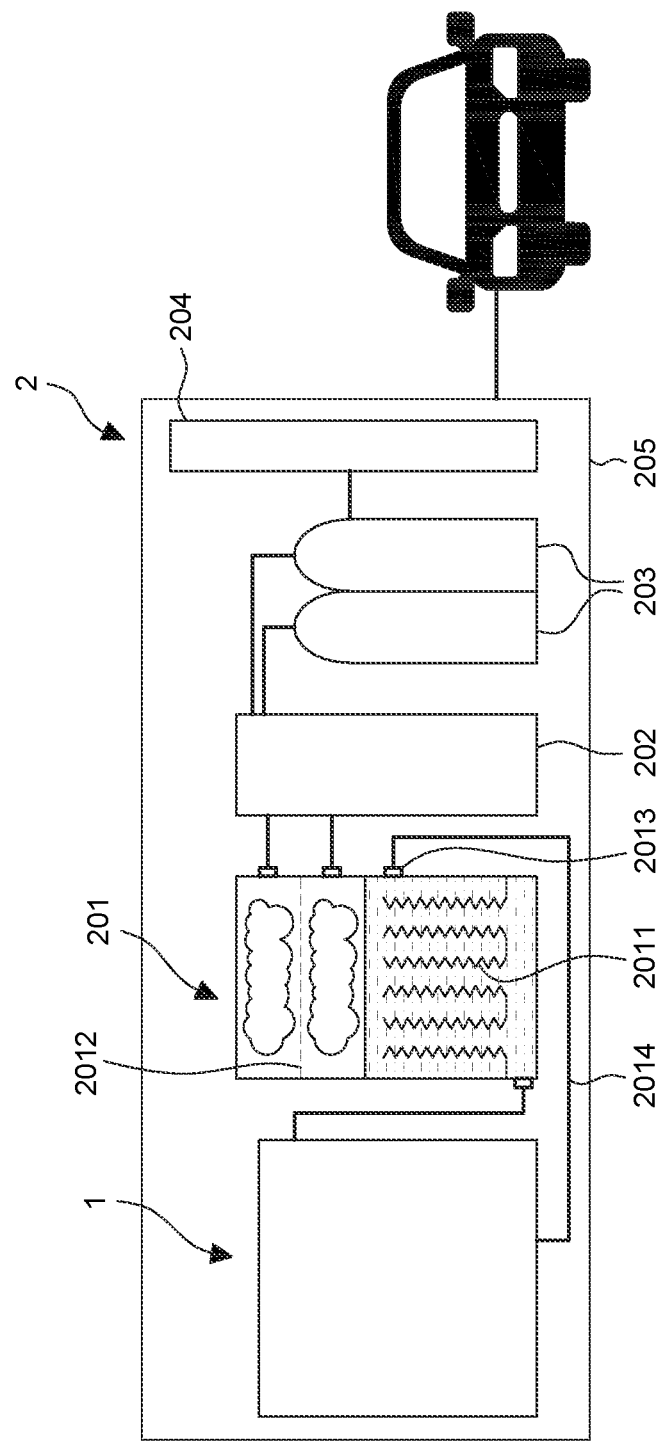
FIG. 19 is a conceptual view schematically illustrating a hydrogen station including a submerged plasma generator according to an embodiment of the present invention.

Referring to FIG. 19, the submerged plasma generator 1 may be applied to a hydrogen station 2 which is capable of producing and supplying hydrogen gas.

The hydrogen station 2 includes the submerged plasma generator 1 and a hydrogen gas generator 201.

The hydrogen gas generator 201 may be connected to the submerged plasma generator 1 so that the working fluid including the H+ ions separated by the submerged plasma generator 1 may be stored therein. Further, in the hydrogen gas generator 201, a catalyst 2011 may be provided to cause a chemical reaction with the working fluid stored therein to change the hydrogen from the working fluid to gas to separate the hydrogen. For example, as the catalyst 2011, lead (Pb) or rhodium (Rh) may be applied. However, the catalyst 2011 is not necessarily limited thereto and may vary to various materials within the condition which can perform the same function. Further, a purifying unit 2012 which may purify the produced hydrogen gas may be further provided in the hydrogen gas generator 201. By doing this, in the hydrogen gas generator 201, a hydrogen gas having a purity which is equal to or higher than a predetermined reference purity and a hydrogen gas having a purity lower than the predetermined reference purity are separately stored with respect to the purifying unit 2012. For example, the purifying unit 2012 may apply a membrane filter including a lead component and in the hydrogen gas generator 201, a hydrogen gas having a purity of 99.97% or higher which is purified by the membrane filter and a hydrogen gas having a purity lower than 99.97% which is not purified by the membrane filter may be stored with respect to the membrane filter. Further, a discharge port 2013 through which the working fluid from which the hydrogen is separated is discharged is formed at one side of the hydrogen gas generator 201 and the discharge port 2013 may include a resupply pipe 2014 which is configured to resupply the discharged working fluid to the submerged plasma generator 1. However, the hydrogen gas generator 201 is not necessarily limited thereto and may vary to various configurations which produce a hydrogen gas having a high purity from the working fluid including hydrogen ions.

Further, the hydrogen station 2 may further include a compression unit 202 which compresses the hydrogen gas produced from the hydrogen gas generator 201 at a predetermined pressure, a storage unit 203 which stores the compressed hydrogen gas, a supply unit 204 which supplies the hydrogen gas stored in the storage unit 203 to the outside, and a container 205 which accommodates the submerged plasma generator 1, the hydrogen gas generator 201, the compression unit 202, the storage unit 203, and the supply unit 204.

However, the hydrogen station 2 is not necessarily limited thereto and may vary to various configurations within a condition which can produce hydrogen gas using the submerged plasma generator 1.

As described above, as the hydrogen station 2 which may produce and supply the hydrogen gas by itself using the submerged plasma generator 1 may be implemented, as compared with the method of producing hydrogen gas by reforming the fossil fuel in a large size manufacturing facility of the related art and then supplying the produced hydrogen gat to a station located in a specific location, the hydrogen gas may be safely and easily produced, the cost may be significantly saved, the hydrogen station may be implemented with a small scale in various locations to build an infrastructure for hydrogen charging.

Figure 20:
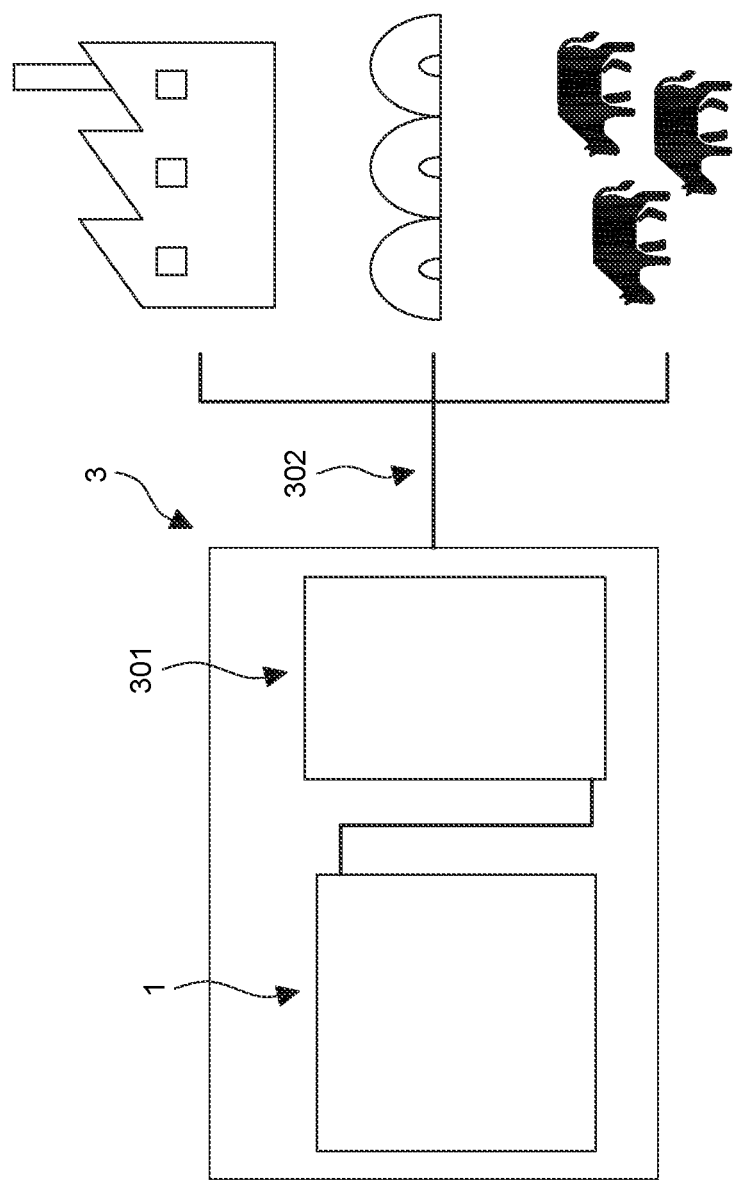
FIG. 20 is a conceptual view schematically illustrating a plasma activated water producing system including a submerged plasma generator according to an embodiment of the present invention.

Referring to FIG. 20, the submerged plasma generator 1 may be applied to a plasma activated water producing system 3 which is capable of producing and supplying plasma activated water.

The plasma activated water producing system 3 includes the submerged plasma generator 1 which ionizes the working fluid to switch the plasma activated water, an activated water storage unit 301 which stores the plasma activated water, and a supply line 302 which supplies the plasma activated water to a target position.

The submerged plasma generator 1 which is applied to the plasma activated water producing system 3 is configured by a reactor 10 and a dielectric insert 20 to simultaneously generate plasma from micro-nano bubbles and ionize a working fluid by the plasma generated therein to produce the plasma activated water.

The activated water storage unit 301 may be connected to the submerged plasma generator 1 to store the plasma activated water produced by the submerged plasma generator 1. In the activated water storage unit 301, a discharge port (not illustrated) which is connected to the supply line 302 to be described below and discharges the plasma activated water may be formed. For example, the activated water storage unit 301 may further include a filter unit (not illustrated) which may filter the plasma activated water flowing therein and a temperature control unit (not illustrated) which maintains the plasma activated water at a predetermined temperature. However, the activated water storage unit 301 is not necessarily limited to this shape but may be modified in various forms.

The supply line 302 is connected to the activated water storage unit 301 and may be configured to supply the plasma activated water stored in the activated water storage unit 301 to a predetermined target location. For example, the supply line 302 may be formed as a single pipe or may be formed as multiple pipes which are branched according to the connected target location. Further, a control valve (not illustrated) may be further provided in the supply line 302 to control the supply of the plasma activated water.

However, the plasma activated water producing system 3 is not necessarily limited thereto and may vary to various configurations under a condition which can produce and supply the plasma activated water using the submerged plasma generator 1.

As described above, as the plasma activated water producing system 3 which may produce and supply the plasma activated water by itself using the submerged plasma generator 1 may be implemented, dissolved water used by dissolving carbon dioxide or ozone in the conventional agriculture, livestock, and fisheries industry may be replaced with plasma activated water, so that it may be used in a large scale and cost may be reduced. Further, the quality of products cultivated or cultured by the plasma activated water may be improved and environmental pollution may be minimized.

As described above, according to an exemplary embodiment of the present invention, unlike the gas plasma generator of the related art, the plasma may be generated only by circulating the working fluid at the room temperature without using a high voltage of thousands or tens of thousands of volts, so that a high density plasma may be generated as compared with the gas plasma and the structure of the apparatus is simplified to save the cost.

Further, the generation of the plasma by sonoluminescence or chemoluminescence is excluded so that the process may be simplified, and the loss rate of the plasma may be minimized.

Furthermore, when the ion separation unit 30 and the metallic probe 40 are excluded, the plasma activated water may be basically produced and if necessary, the ion separation unit 30 or the metallic probe 40 is selectively applied to separate hydrogen ions or acquire electric energy so that it is applicable to all the hydrogen gas generating system, the plasma activated water producing system, and a plasma electric power generating system.

The exemplary embodiments of the present invention have been illustrated and described above, but the present invention is not limited to the above-described specific embodiment, it is obvious d that various modification may be made by those skilled in the art, to which the present invention pertains without departing from the gist of the present invention, which is claimed in the claims, and such modified embodiments should not be individually understood from the technical spirit or prospect of the present invention.

What is claimed is:

1. A method of A submerged plasma generator, comprising:
   a reactor which has a flow path formed in a lengthwise direction therein, the flow path permitting working fluid to travel therein; and
   a dielectric insert which is disposed in the flow path so as to define the flow path into a first space and a second space different from the first space, and has formed therein a through-hole smaller than the flow path to generate micro-nano bubbles by cavitation in the working fluid fed into the first space of the flow path, and includes a metallic catalyst which undergoes friction with the working fluid flowing through the through-hole and releases electric charges of the same polarity to the micro-nano bubbles to collapse the micro-nano bubbles and generate plasma;
   wherein the second space of the flow path in which the working fluid ionized by exposure to the plasma travels is formed in an oval structure,
   wherein the submerged plasma generator further comprises:
   an ion separation unit which is provided on an outer surface of the reactor corresponding to the other space of the flow path, forms a magnetic field in the other space of the flow path to separate H+ ions and OH— ions from the working fluid which is ionized by exposure to the plasma by passing through the dielectric insert,
   wherein a contact surface of the ion separation unit which is in contact with the outer surface of the reactor corresponds to a diameter of the other space of the flow path or is formed to have a width larger than the diameter of the other space of the flow path, and
   wherein a seating support groove in which the ion separation unit is seated is formed on the outer surface of the reactor to be dented with a predetermined depth toward the flow path and the contact surface which is in contact with the seating support groove and an inner surface of the reactor which forms the other space of the flow path are spaced apart from each other with a distance of at least 4 to 11 mm therebetween.

2. The submerged plasma generator of claim 1, wherein the first space of the flow path is formed in a circular structure in which a horizontal diameter and a vertical diameter are the same and the second space of the flow path is formed such that a horizontal diameter is larger than a vertical diameter.

3. The submerged plasma generator of claim 2, wherein the second space of the flow path is formed in an oval structure including a plurality of flat sections disposed to be opposite to each other in a vertical direction and a plurality of curved sections disposed to be opposite to each other in a horizontal direction.

4. The submerged plasma generator of claim 1, wherein the ion separation unit includes a plurality of magnetic substances which is disposed to opposite to each other with the flow path therebetween along a vertical direction and is formed to enclose the entire outer surface or a part of the outer surface of the reactor and the plurality of magnetic substances includes a first magnetic substance which is disposed at an upper side of the reactor such that an S polarity is directed to the flow path and a second magnetic substance which is disposed at a lower side of the reactor such that an N polarity is directed to the flow path.

5. The submerged plasma generator of claim 4, wherein the plurality of magnetic substances is formed in a wedge structure in which a width of a cross section is gradually reduced toward the flow path.

6. The submerged plasma generator of claim 4, wherein the ion separation unit further includes a magnetic substance support unit which supports both side surfaces of the plurality of magnetic substances to restrict the flow of the plurality of magnetic substances.

7. The submerged plasma generator of claim 4, wherein the ion separation unit further includes a shielding unit which is provided at the outside of the first magnetic substance and the second magnetic substance so as to enclose the first magnetic substance and the second magnetic substance to shield a magnetic field formed by the first magnetic substance and the second magnetic substance.

8. The submerged plasma generator of claim 7, wherein the shielding unit is formed of a metallic material and is formed in a multilayered structure.

9. The submerged plasma generator of claim 4, wherein the ion separation unit further includes a third magnetic substance which is disposed on both side surfaces of the first magnetic substance such that an S polarity is directed to the first magnetic substance and a fourth magnetic substance which is disposed on both side surfaces of the second magnetic substance to be opposite to the third magnetic substance such that an N polarity is directed to the second magnetic substance.

10. The submerged plasma generator of claim 1, further comprising:
   a branch unit which is provided in the reactor and includes a plurality of branched flow paths configured to branch the $H^+$ ion and the $OH^-$ ion separated by the ion separation unit to different directions.

11. The submerged plasma generator of claim 10, wherein the plurality of branched flow paths includes a first branched flow path which guides the movement of the working fluid including the $H^+$ ions and a second branched flow path which is disposed to be opposite to the first branched flow path along a horizontal direction and guides the movement of the working fluid including the $OH^-$ ions, and the first branched flow path and the second branched flow path are branched at an angle of 26.5 degrees to 30 degrees.

* * * * *